Jan. 26, 1954  C. C. S. LE CLAIR  2,667,235
LIQUID OR LUBRICANT DISTRIBUTION SYSTEM
Filed April 17, 1948  18 Sheets-Sheet 3

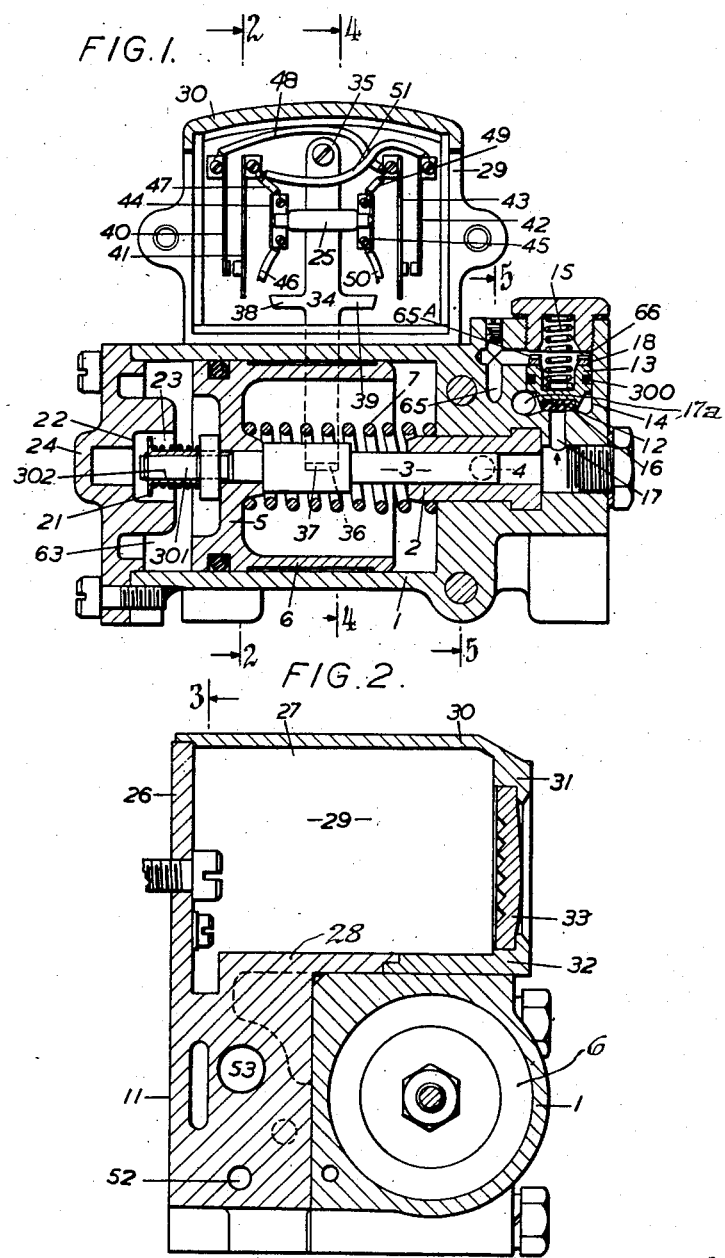

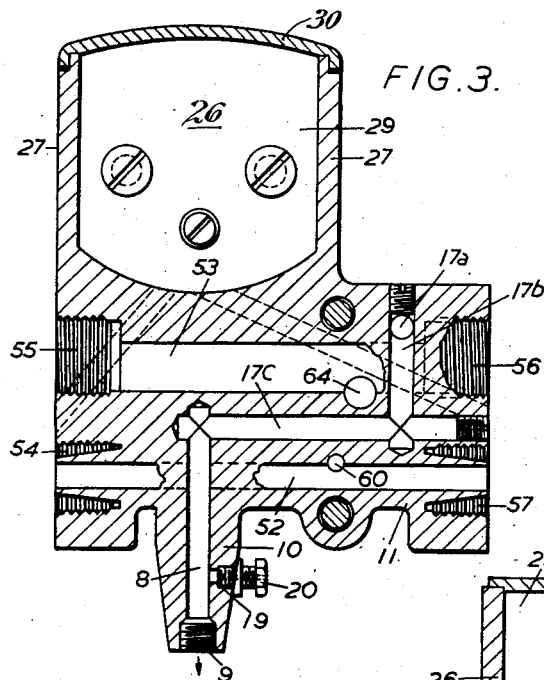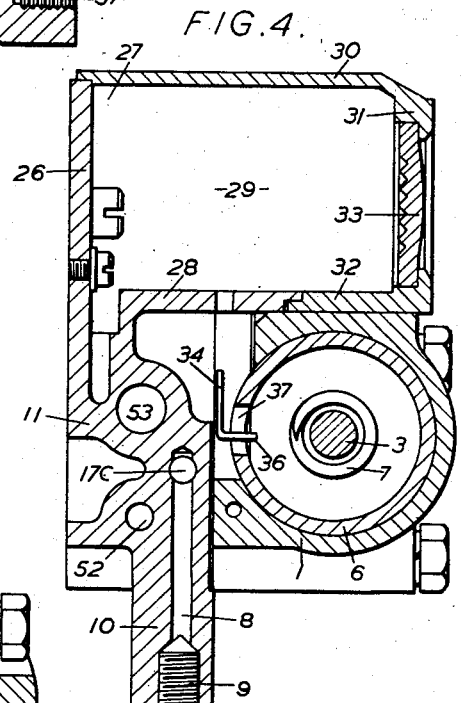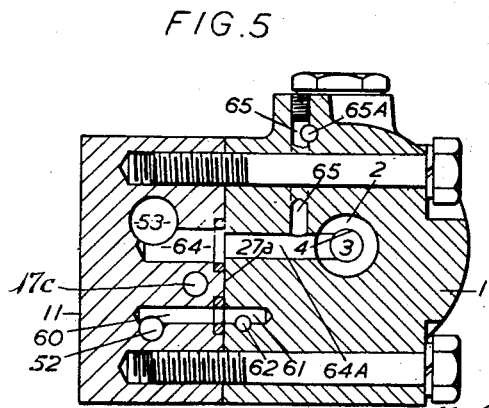

Inventor:
Camille Clare Sprankling Le Clair
By
Hinkle, Horton, Ahlberg & Hupper
Attorneys.

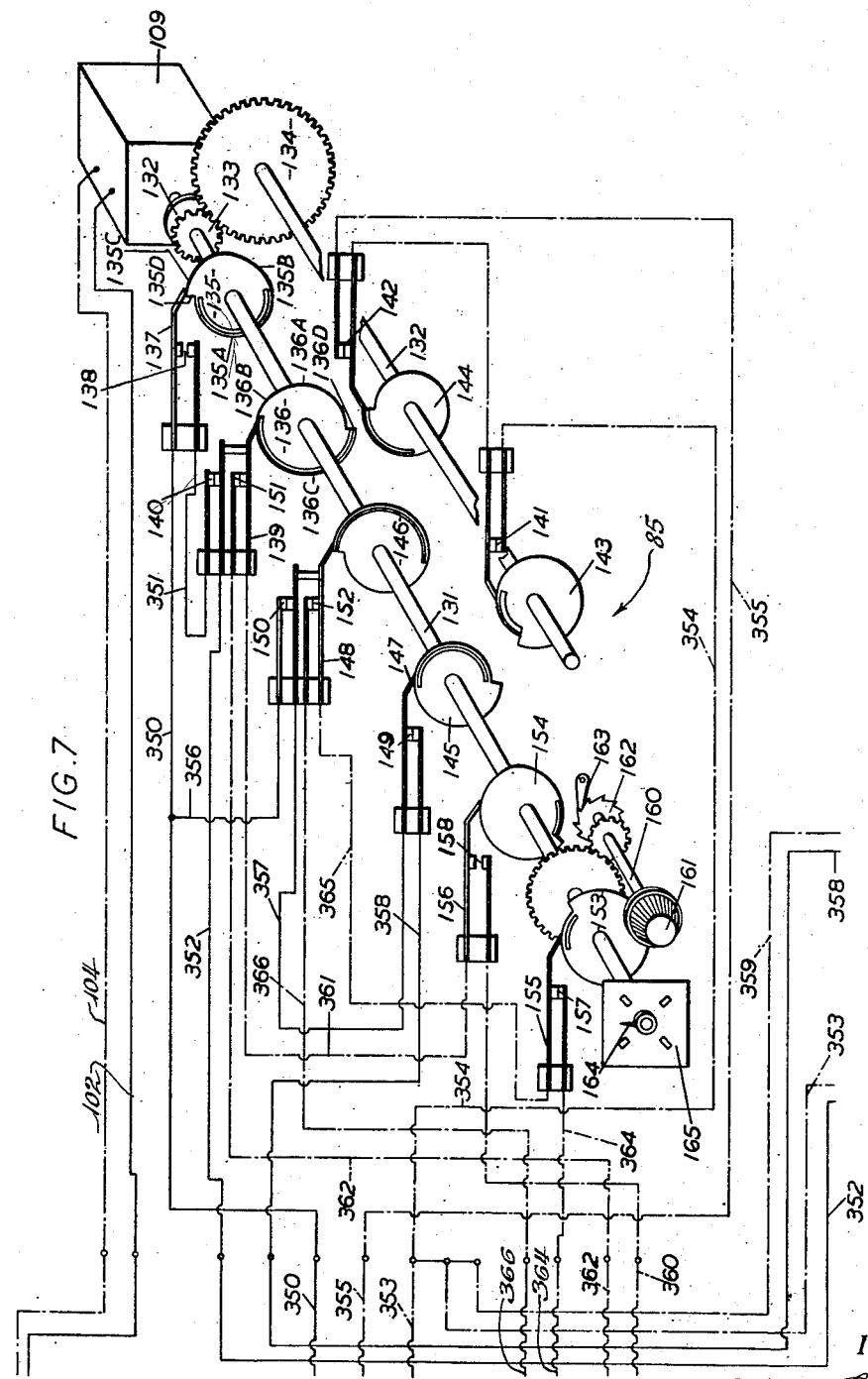

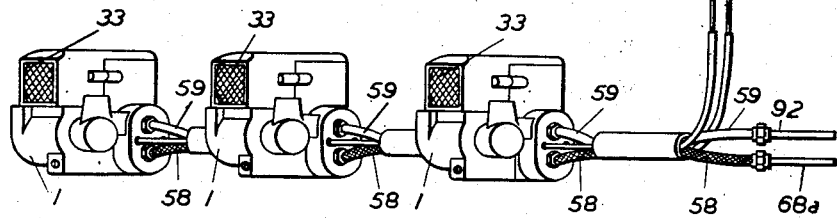
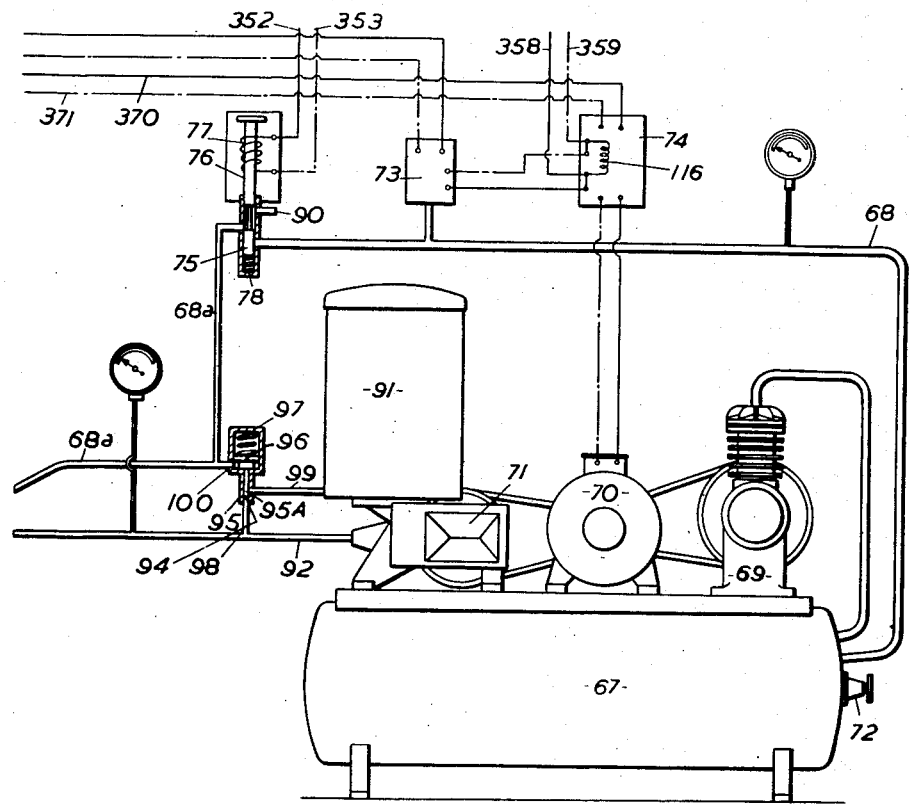

Jan. 26, 1954

C. C. S. LE CLAIR 2,667,235

LIQUID OR LUBRICANT DISTRIBUTION SYSTEM

Filed April 17, 1948

Inventor:
Camille Clare
Sprankling
Le Clair
By
Hinkle, Horton, Ahlberg & Hupper
Attorneys.

Jan. 26, 1954  C. C. S. LE CLAIR  2,667,235
LIQUID OR LUBRICANT DISTRIBUTION SYSTEM
Filed April 17, 1948  18 Sheets-Sheet 7
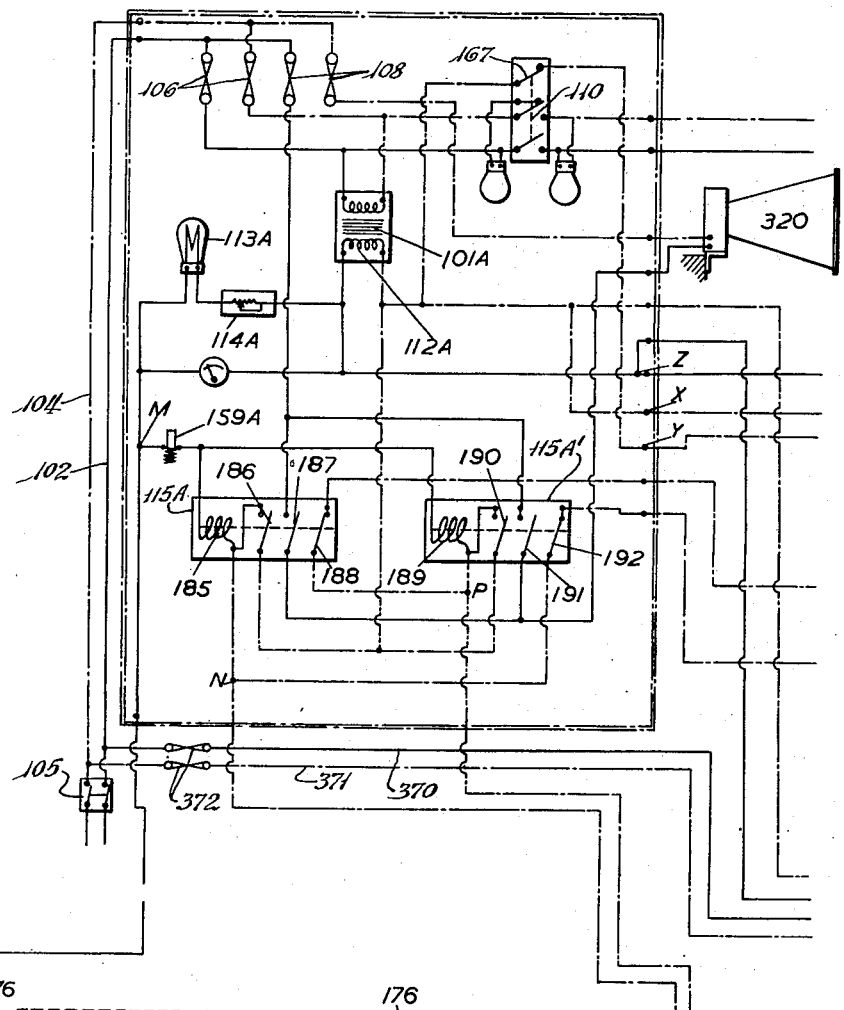
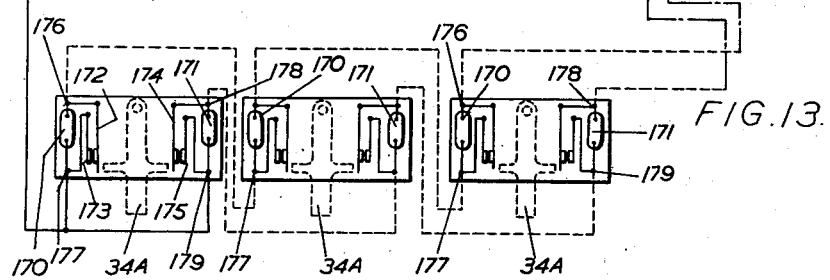
Inventor:
Camille Clare Sprankling Le Clair
By
Hinkele, Horton, Ahlberg & Hupper
Attorneys.

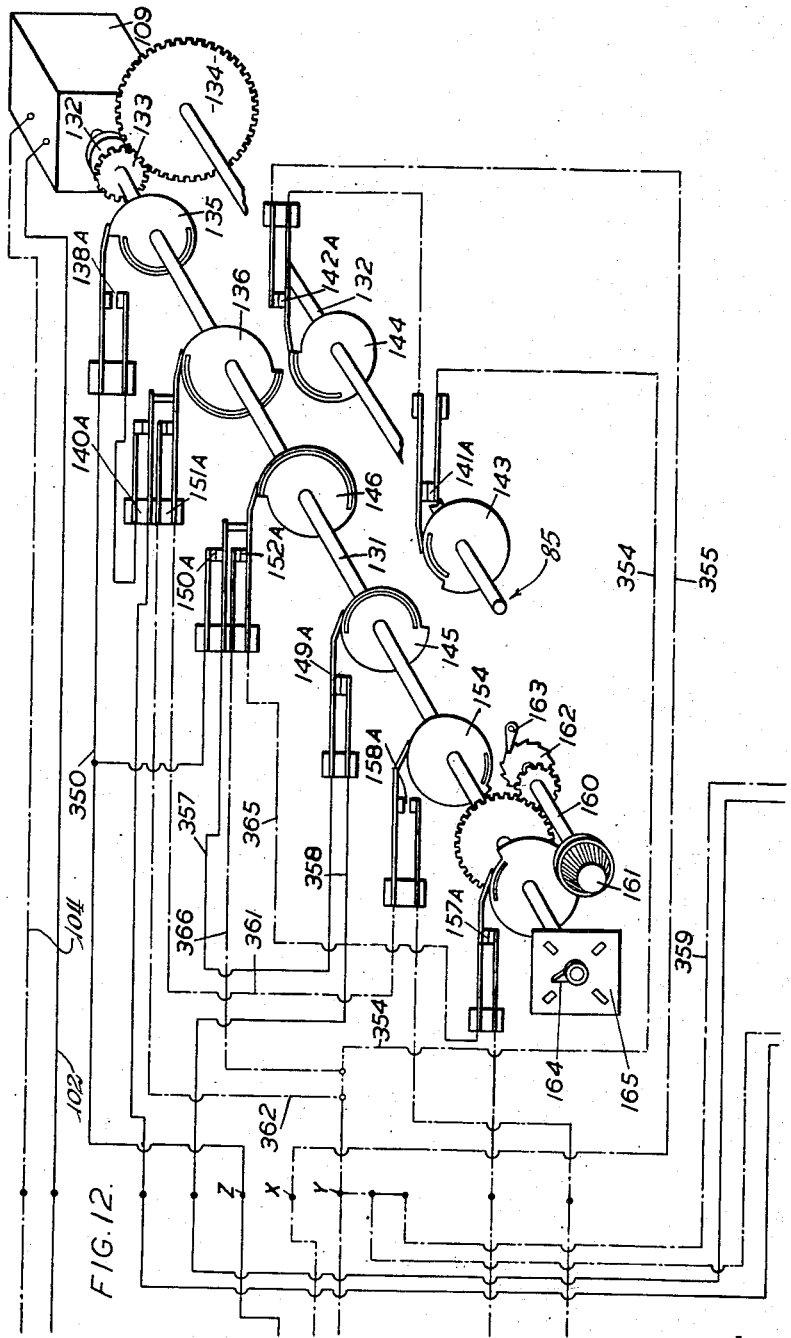

Jan. 26, 1954   C. C. S. LE CLAIR   2,667,235
LIQUID OR LUBRICANT DISTRIBUTION SYSTEM
Filed April 17, 1948   18 Sheets-Sheet 9

Inventor:
Camille Clare Sprankling Le Clair
By
Hinkle, Horton, Ahlberg & Whipper
Attorneys.

Jan. 26, 1954     C. C. S. LE CLAIR     2,667,235
LIQUID OR LUBRICANT DISTRIBUTION SYSTEM
Filed April 17, 1948     18 Sheets-Sheet 10
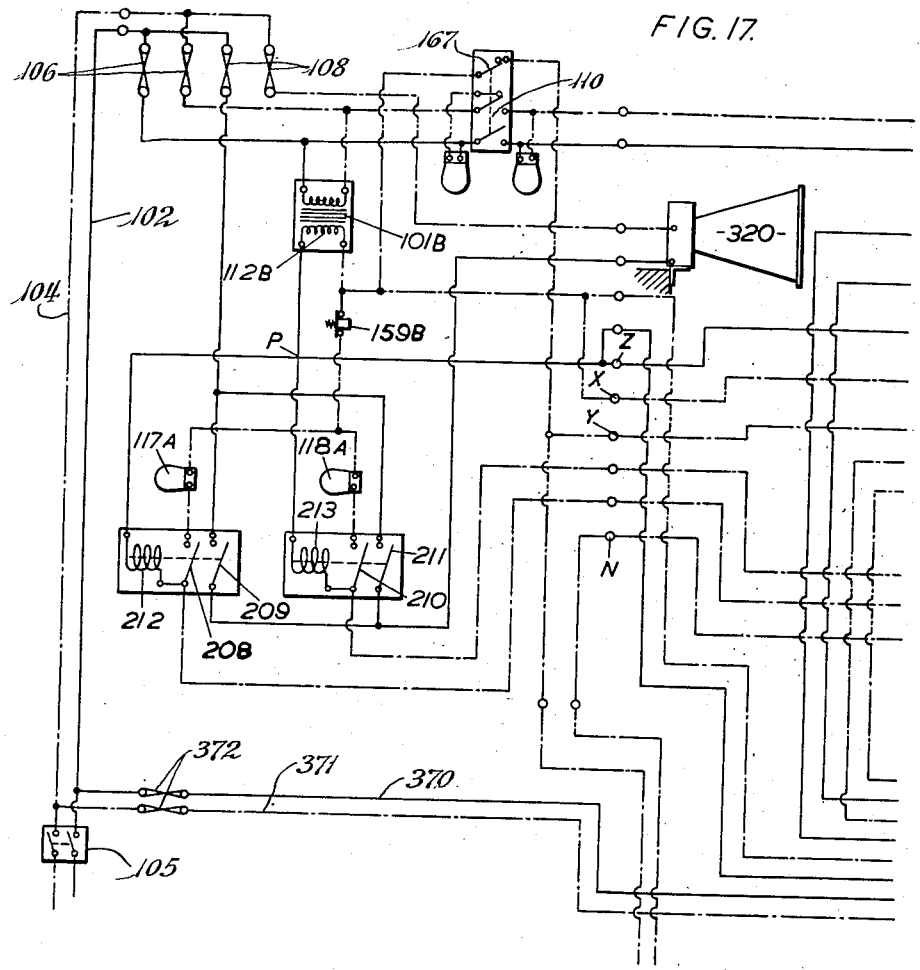
FIG. 17.
FIG. 19.
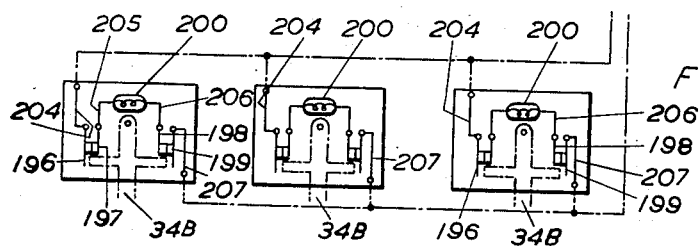
Inventor:
Camille Clare Sprankling Le Clair
By Hinkle, Horton, Ahlberg & Nupper
Attorneys.

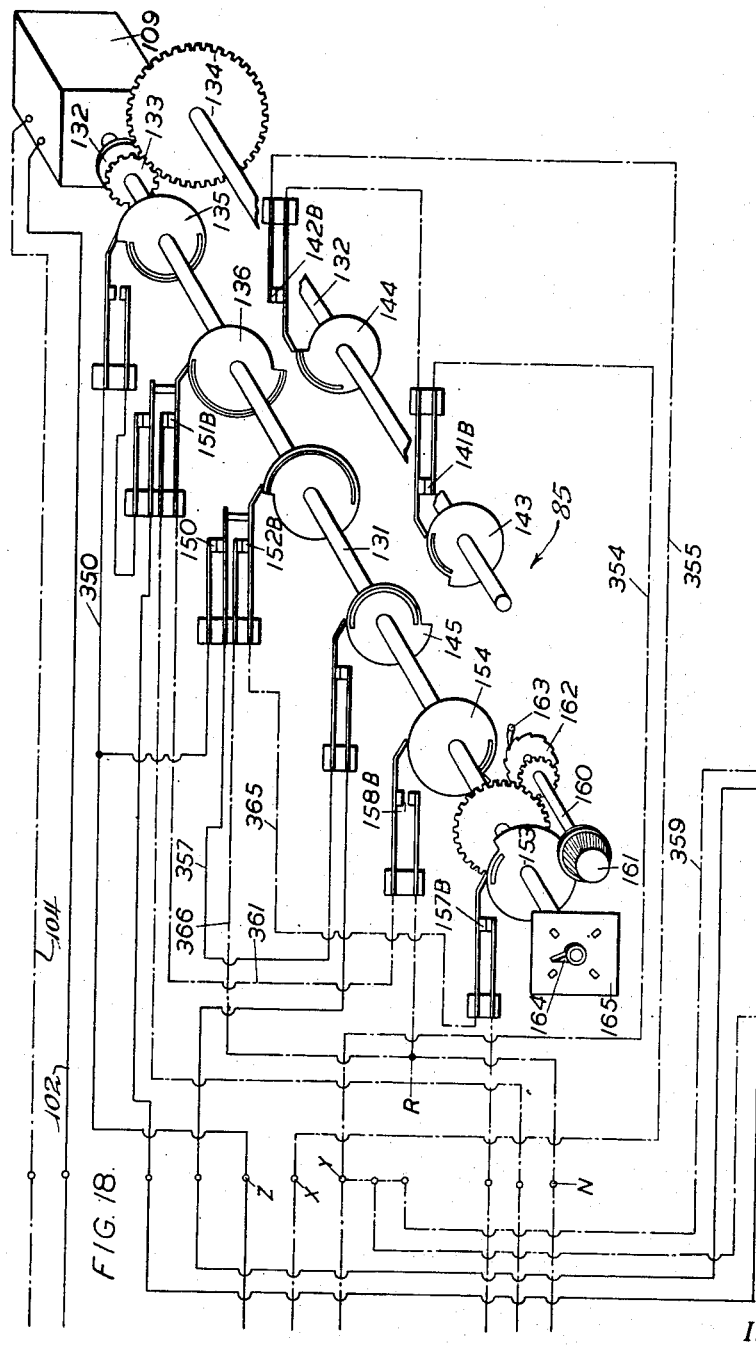

Jan. 26, 1954 C. C. S. LE CLAIR 2,667,235
LIQUID OR LUBRICANT DISTRIBUTION SYSTEM
Filed April 17, 1948 18 Sheets-Sheet 13
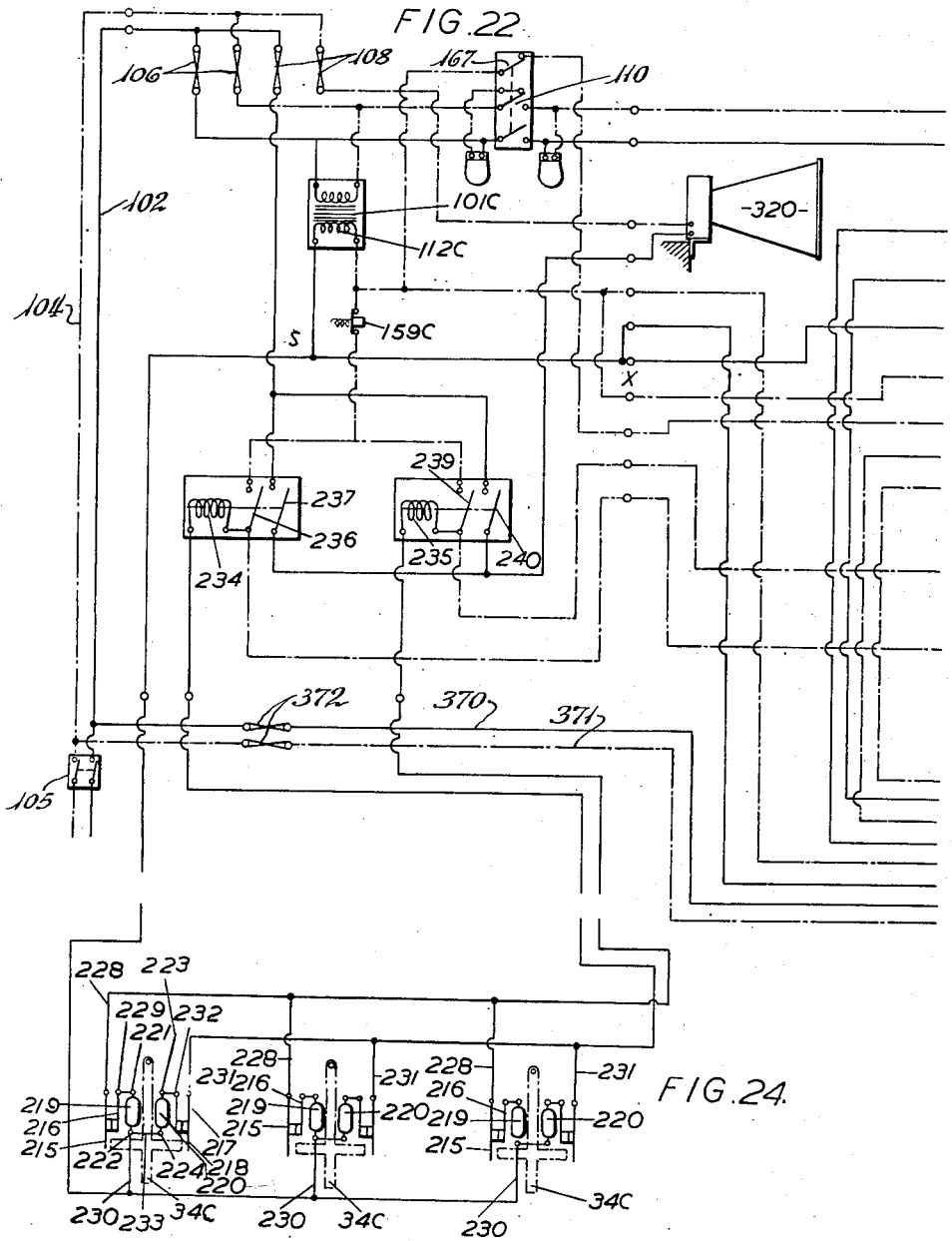
Inventor:
Camille Clare Sprankling Le Clair
By
Hinkle, Horton, Ahlberg & Wupper
Attorneys.

Jan. 26, 1954   C. C. S. LE CLAIR   2,667,235
LIQUID OR LUBRICANT DISTRIBUTION SYSTEM
Filed April 17, 1948   18 Sheets-Sheet 14
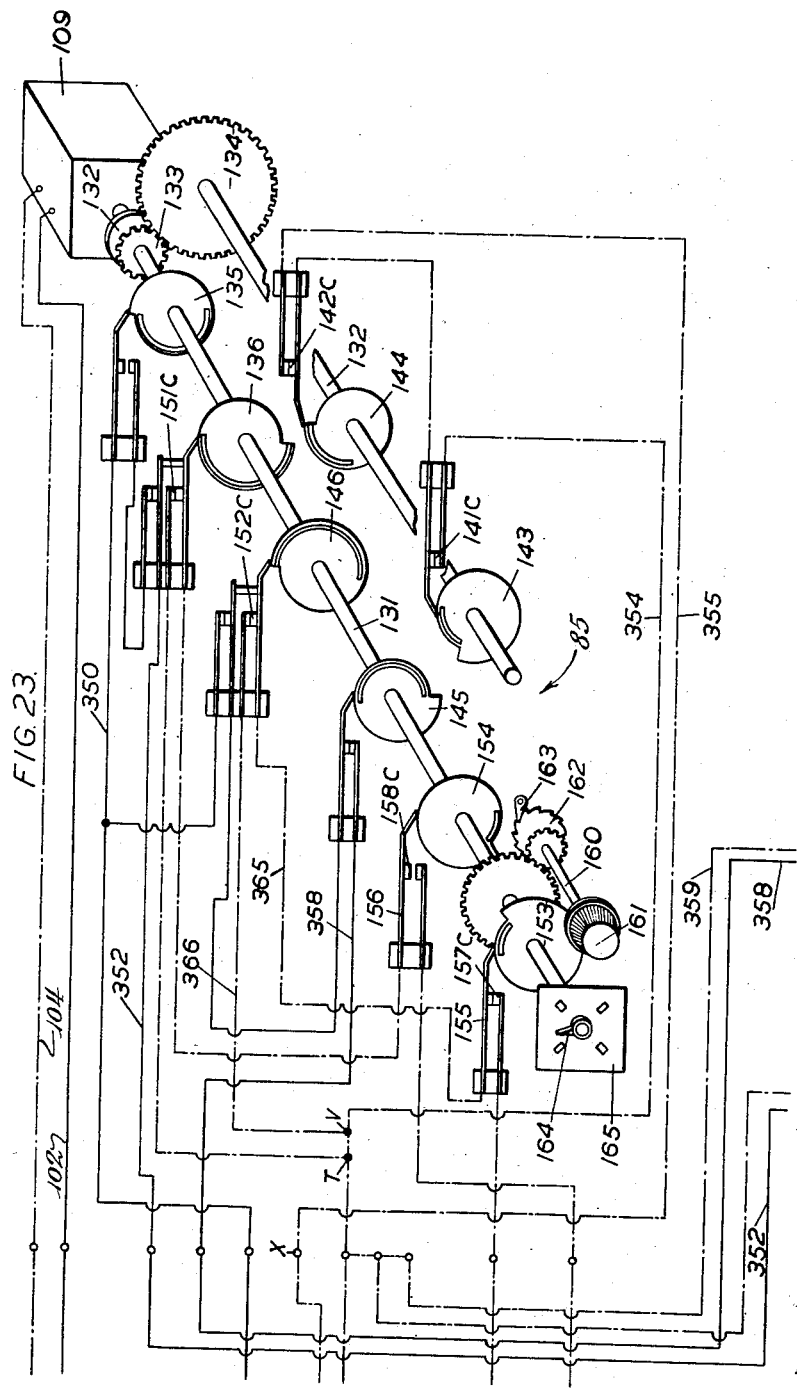
Inventor:
Camille Clare Sprankling Le Clair
By
Hinkle, Horton, Ahlberg & Kupper
Attorneys.

Jan. 26, 1954  C. C. S. LE CLAIR  2,667,235
LIQUID OR LUBRICANT DISTRIBUTION SYSTEM
Filed April 17, 1948  18 Sheets-Sheet 15

Inventor:
Camille Clare Sprankling Le Clair
By
Hinkle, Horton, Ahlberg & Wupper
Attorneys.

Jan. 26, 1954     C. C. S. LE CLAIR     2,667,235
LIQUID OR LUBRICANT DISTRIBUTION SYSTEM
Filed April 17, 1948     18 Sheets-Sheet 17

Inventor:
Camille Clare Sprankling Le Clair
By Hinkle, Horton, Ahlberg & Kupper
Attorneys.

Jan. 26, 1954 C. C. S. LE CLAIR 2,667,235
LIQUID OR LUBRICANT DISTRIBUTION SYSTEM
Filed April 17, 1948 18 Sheets-Sheet 18

Inventor:
Camille Clare Sprankling Le Clair
By
Hinkle, Horton, Ahlberg & Kupper
Attorneys.

Patented Jan. 26, 1954

2,667,235

UNITED STATES PATENT OFFICE 2,667,235

LIQUID OR LUBRICANT DISTRIBUTION SYSTEM

Camille Clare Sprankling Le Clair, Acton, London, England, assignor to Tecalemit Limited, Brentford, England, a corporation of Great Britain Application April 17, 1948, Serial No. 21,634

Claims priority, application Great Britain April 29, 1947

40 Claims. (Cl. 184—7)

This invention relates to liquid or lubricant distributing systems, particularly to lubricant distributing systems of the kind which are used for distributing lubricant to bearings or other places of use, on vehicles, engines, machines, or large industrial plant lay-outs such as rolling-mills and so on, and which comprise lubricant pumping or metering devices or injectors adapted to be attached to, or to be placed in proximity to, bearings or places of use, these devices being joined together by one or more conduits for the purpose of conveying lubricant to them and also for conveying the pressure fluid used for operating their individual pumping or metering or injection mechanisms. Examples of such systems are disclosed in my co-pending application Serial No. 733,819, now Patent No. 2,521,177.

It is highly desirable in all such systems that means should be provided whereby the operator can tell at a glance if everything is functioning in the desired manner and it is an advantage if visible and/or audible warning can be given in the event of the system, or any part of it, ceasing to function.

One object of the present invention, is, therefore, to provide a liquid or lubricant distributing system (hereinafter referred to as a "lubricant-distributing system") in which not only is lubricant positively delivered to a number of places of use by separate, individual, distributors or injectors but which also includes means whereby if any single injector fails to act in the desired fashion it gives immediate warning, either visible or audible or both.

A further object is to provide a lubricant-distributing system of the kind referred to, comprising a source of fluid under pressure, a source of lubricant under pressure, one or more fluid-operated lubricant injectors, which, or each of which, receives lubricant on its charge stroke and acts to force lubricant to at least one place of use on its discharge stroke, means for controlling the operation of the injector, or injectors, and an electrical system which includes electrically-operated fault-detecting means for detecting failures of the injector, or any of the injectors, to operate, means associated with the said fault-detecting means for indicating when a failure takes place in the charge stroke or in the discharge stroke of the injector, or any of the injectors, and control means for controlling the cycle or sequence of operation of the injector, or injectors, and of the said fault-detecting means.

Another object is to provide a lubricant-distributing system which comprises two electrically-operated discriminating means, both associated with or forming part of the said fault-detecting means, for discriminating between a failure on the injector charge stroke and a failure on the injector discharge stroke.

A further object is to provide such a system in which the operation of the injector, or injectors, is either controlled by mechanical means or by the above mentioned electrical system.

Another object is to provide a system of the character described wherein the said means for indicating when a failure takes place in the charge stroke or in the discharge stroke of the injector, or any of the injectors, is associated with the said fault-detecting means and with the said discriminating means.

Yet another object is to provide such a system in which the said means for indicating when a failure takes place in the charge stroke or in the discharge stroke of the injector, or any of the injectors, is associated with the injector, or injectors.

A still further object is to provide such a system in which the said means for indicating when a failure takes place in the charge stroke or in the discharge stroke of the injector, or any of the injectors, is associated with the said fault-detecting means.

Another object is to provide a system of the character described in which the movements of the plunger, or plungers, of the injector, or injectors, or of means associated with the, or each, plunger are arranged to bring about the operation of the said fault-detecting means.

A still further object is to provide such a system in which the, or each, injector plunger is arranged in association with one or more switches, which is, or are, included in a circuit or circuits in which the said fault-detecting means is also included and which is, or are, only actuated when the injector plunger completes its charge or its discharge strokes, in either of which events the fault-detecting means remains inoperative, whereas if and when the plunger fails to complete its charge and discharge stroke, the fault-detecting means becomes operative and automatically brings the said discriminating means into operation.

Another object is to provide such a system in which the said control means comprises a main control mechanism which is adapted to actuate switches included in the said electrical system so as to control the cycle of operation of means for the supply of pressure fluid to the injector, or injectors, thus effecting their discharge strokes and which is also adapted to actuate other switches included in the said electrical control system so as to control the cycle of operations of means for controlling the supply of lubricant to the injector, or injectors, during the charge strokes of the latter.

Still a further object is to provide a lubricant-distributing system of the kind referred to which includes a supplementary control means which is adapted to control the frequency of operation of the electrical system and of the injector, or injectors, as controlled by the said main control mechanism, the said supplementary control means consisting for example of a frequency shaft which is adapted to actuate switches which are included in the said electrical system and are associated with switches actuated by the main control mechanism.

In one construction the said main control mechanism comprises a main control shaft, which during each revolution is adapted to control one cycle of operation of the injector, or injectors, and to control one cycle of operations of the said electrical system.

In the same construction, the said frequency shaft is driven by the said main control shaft in such a maner that although the main control shaft is driven continuously, after one revolution of the main control shaft during which the latter is effective to cause the opertaion of the injector, or injectors, and to control the operation of the said electrical system, it is rendered ineffective during one or more succeeding revolutions, after which it is again rendered effective.

The said means for indicating when a failure takes place in the charge stroke or discharge stroke of the injector, or any of the injectors, comprises visible warning means and (or) audible warning means.

Thus, the said visible warning means may include a single lamp which is associated with the, or each, injector and which is illuminated or extinguished as and when the said injector fails to complete, or does complete, its charge or discharge stroke, and thus to operate one of two switches which are included in circuits in which the said fault-detecting means is also included.

On the other hand, the said visible warning means may include two lamps which are associated with the, or each, injector, one of the lamps being illuminated or extinguished as and when the injector fails to complete, or does complete, its charge stroke and thus to open a switch in a circuit in which the said fault-detecting means is also included, and the other lamp being illuminated or extinguished when the injector plunger fails to complete, or does complete, its discharge stroke and thus to operate another switch is a circuit in which the said fault-detecting means is also included.

The said visible warning means may also include two tell-tale lamps, the illumination or extinguishing of which is controlled by the said fault-detecting means, in such a manner that when a failure occurs in the charge stroke of the injector, or one or more of the injectors, one of the tell-tale lamps is illuminated or extinguished, while when a failure occurs in the discharge stroke of the injector, or one or more of the injectors, the other tell-tale lamp is illuminated or extinguished, the said lamps respectively indicating whether the failure has taken place on the charge stroke or the discharge stroke.

The said audible warning means will preferably be adapted to operate immediately a failure occurs in either the charge stroke or the discharge stroke of the injector or any of the injectors, and its operation may be controlled by the said fault-detecting means.

In constructional forms of the invention which are more fully described hereinafter the lubricant to be distributed is grease and the operating pressure fluid is compresed air. The said electrical system includes a discharge circuit which, when closed under the control of the said control means or main control mechanism is adapted to control the feeding of the pressure fluid to the, or each, injector actuating piston, thereby causing the discharge stroke to be performed.

The same constructions also include a charge circuit, a discharge test circuit and a charge test circuit, all under the control of the said control means or main control mechanism.

The charge circuit is held open while the said discharge circuit is closed and is closed when the discharge circuit is open. When closed it is adapted to control the feeding of the lubricant to the or each injector.

The discharge test circuit, under the control of the said control means, or main control mechanism, is closed at a predetermined time after the closing of the discharge circuit, and opens simultaneously with the opening of the discharge circuit, the closing of the discharge test circuit causing the said fault-detecting means to operate if the injector, or one or the injectors, has failed to complete its discharge stroke.

The charge test circuit, under the control of the said control means or main control mechanism, is closed at a predetermined time after the closing of the charge circuit, and opens simultaneously with the opening of the charge circuit, the closing of the charge test circuit causing the said fault-detecting means to operate if the injector, or any of the injectors, has failed to complete its charge stroke.

The said discharge circuit, the charge circuit, the discharge test circuit and the charge test circuit are adapted to be opened and closed by switches all of which are actuated at predetermined intervals by the said control means or main control mechanism.

The discharge circuit may include a solenoid which when energised on the closing of the circuit is adapted to actuate a main pressure-fluid control valve which then allows pressure-fluid to flow from a source of supply of the injector, or injectors, and which also acts to allow the pressure of the lubricant in the injector, or injectors, to be relieved so that the lubricant pressure does not oppose the discharge stroke of the injector, or any of the injectors.

Lubricant may be supplied to the injector, or injectors, by means of a main lubricant pump which is driven by an electric motor, and the said charge circuit may include a switch controlling the motor starter, the arrangement being such that when the charge circuit is closed the lubricant pump is operated and forces lubricant under pressure to the injector, or injectors.

Several constructional forms of the present invention as applied to grease dispensing systems are shown, by way of example, on the accompanying sheets of drawings, whereon:

Figure 1 is a sectional view of one form of injector which comprises an air-operated piston and plunger, a single normally illuminated injector lamp and two normally open injector switches which are in parallel with the lamp circuit, one of which is closed when the piston and plunger complete their discharge strokes, the other being closed when the piston and plunger complete their charge stroke, the injector lamp being short-circuited and extinguished in either case;

Figure 2 is a section on the line 2—2 in Figure 1, the injector lamp and its switches being omitted from the figure;

Figure 3 is a section on the line 3—3 in Figure 2, showing air and grease ports and passages;

Figure 4 is a section on the line 4—4 in Figure 1, the injector lamp and its switches being omitted from the figure;

Figure 5 is a section on the line 5—5 in Figure 1 showing air and grease ports and passages;

Figure 10:
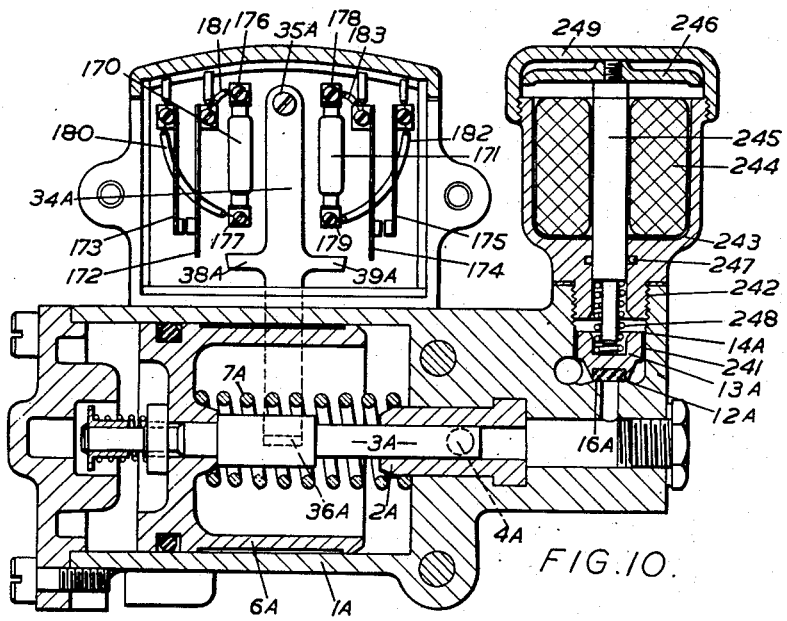
Figure 14:
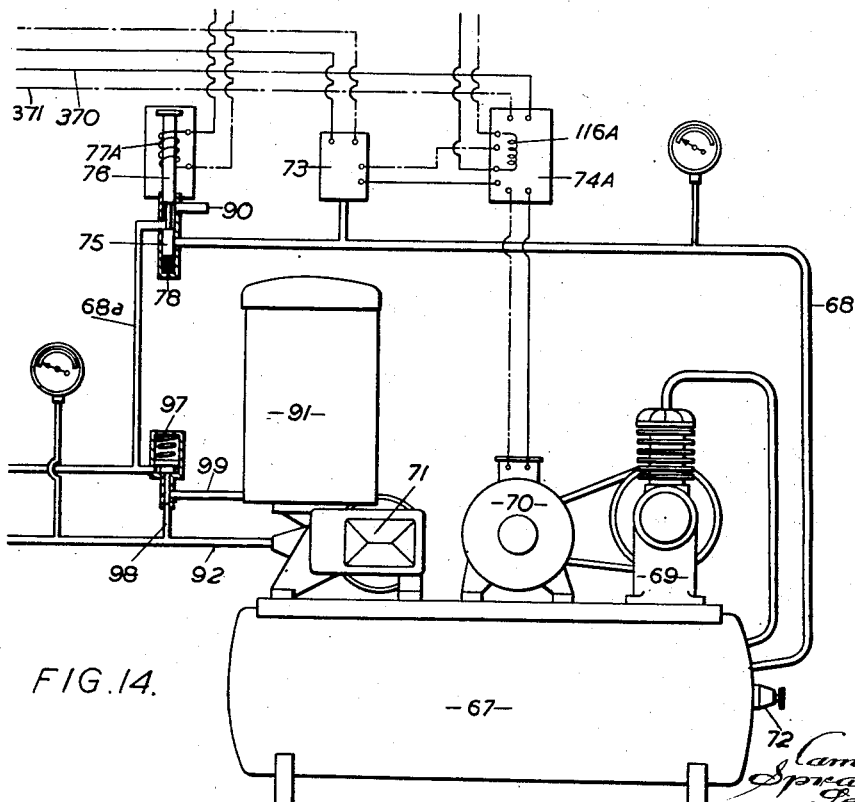

Figures 6 to 9, which are to be read together, show the wiring diagram of the system together with the control means, a number of the injectors, the air container, the air compressor, the grease pump and the electric motor for driving the air compressor and the grease pump;

Figure 10 is a sectional view of a modified form of injector which is fitted with two lamps, and which comprises two normally-open injector lamp switches, one of which is in parallel with each of the lamps and is closed when the injector completes a discharge or charge stroke, the respective lamp being thereby extinguished in either case.

Figure 15:
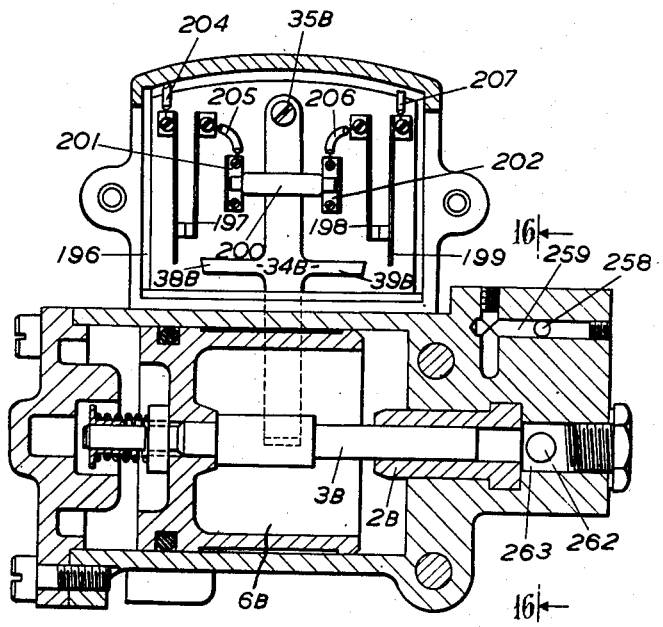
Figure 16:
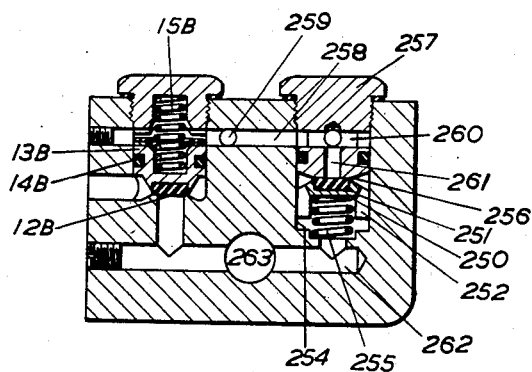
Figure 20:
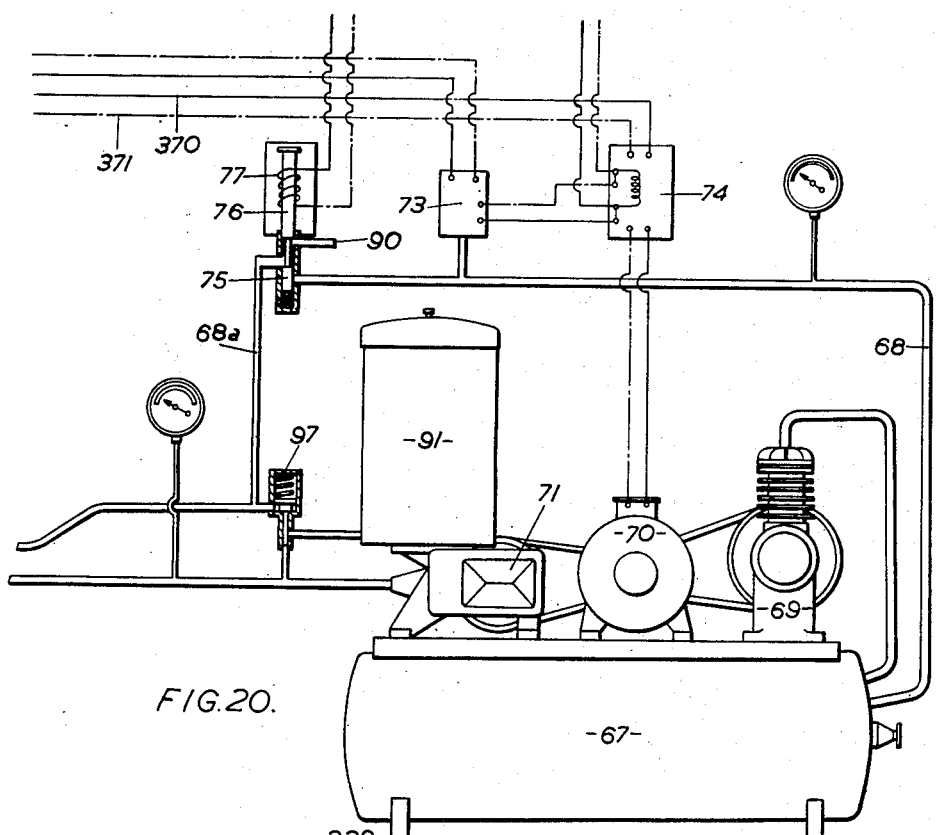
Figure 21:
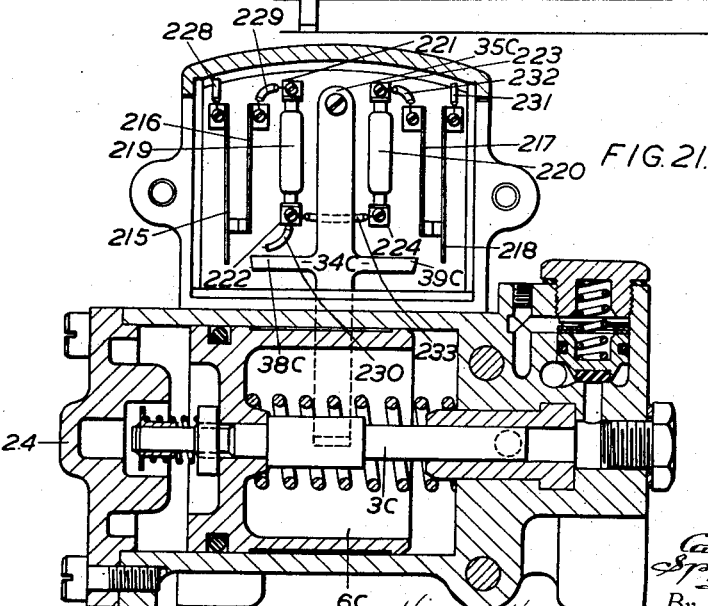
Figure 25:
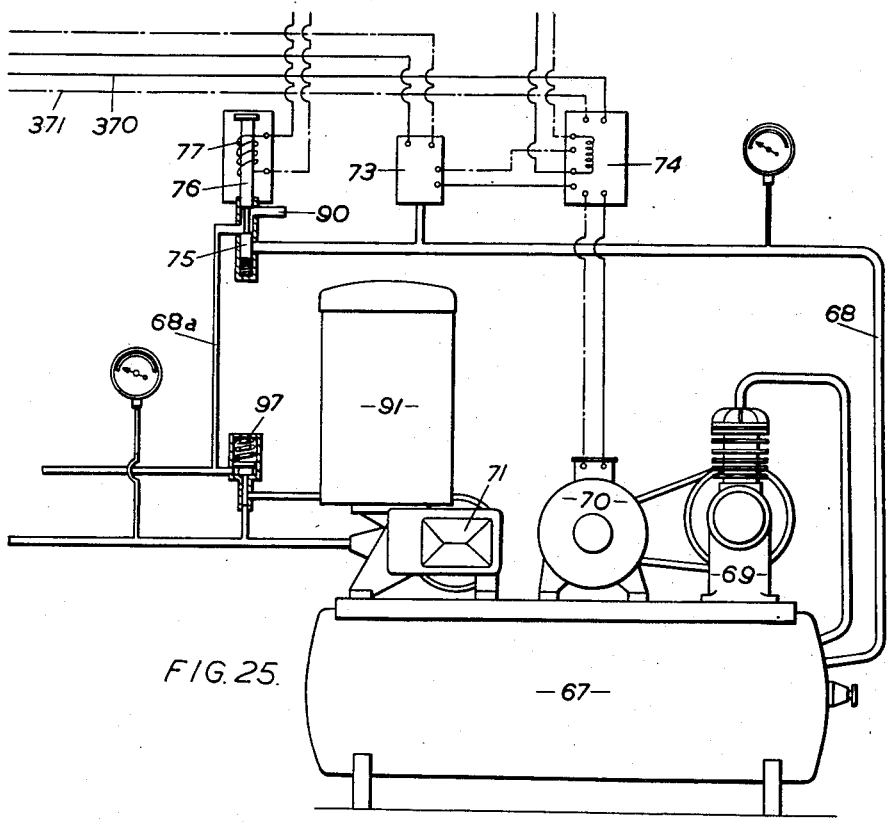
Figure 26:
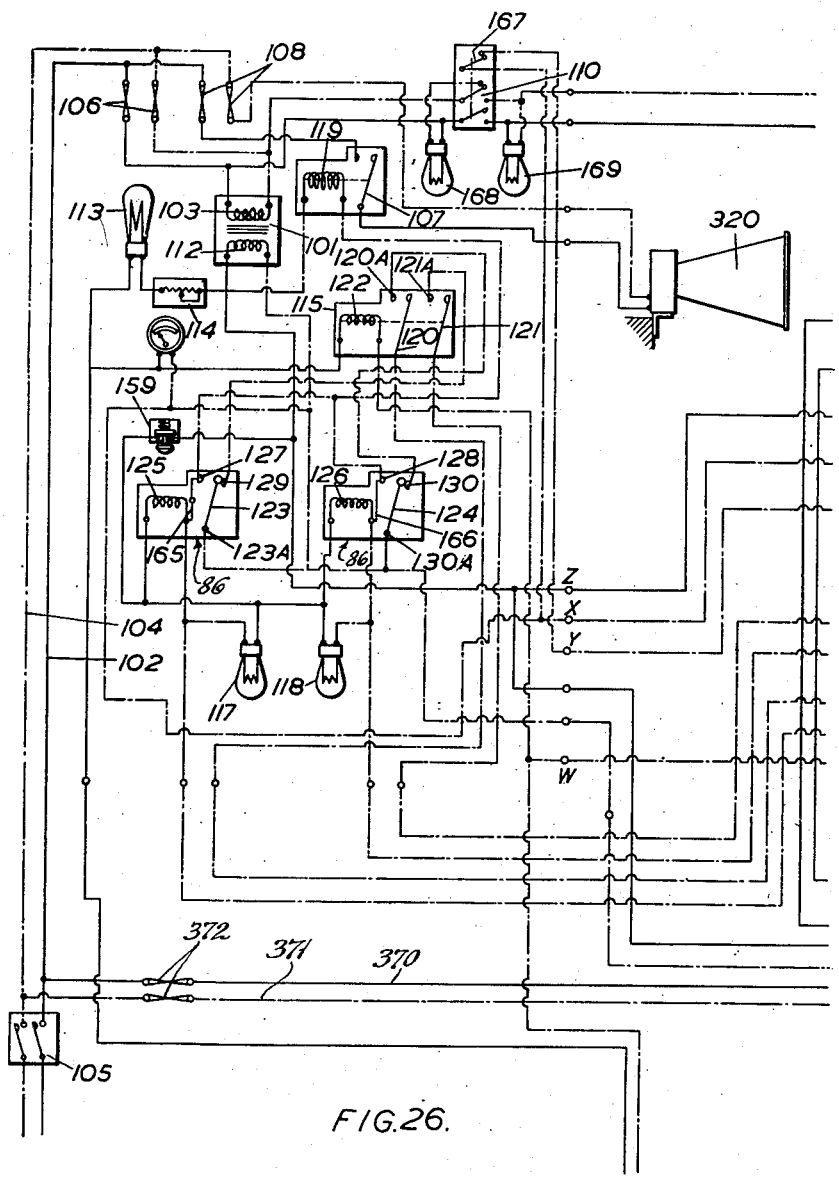
Figure 27:
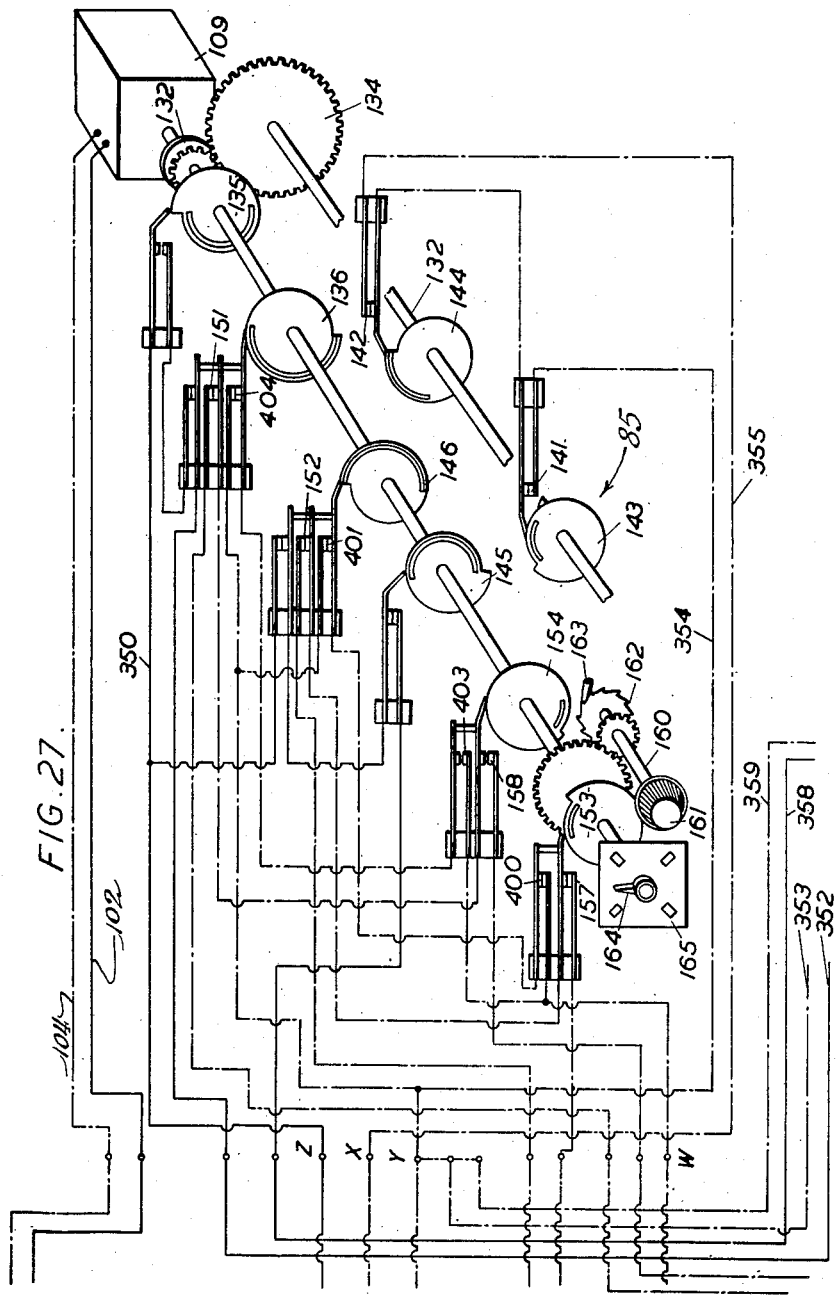
Figure 28:
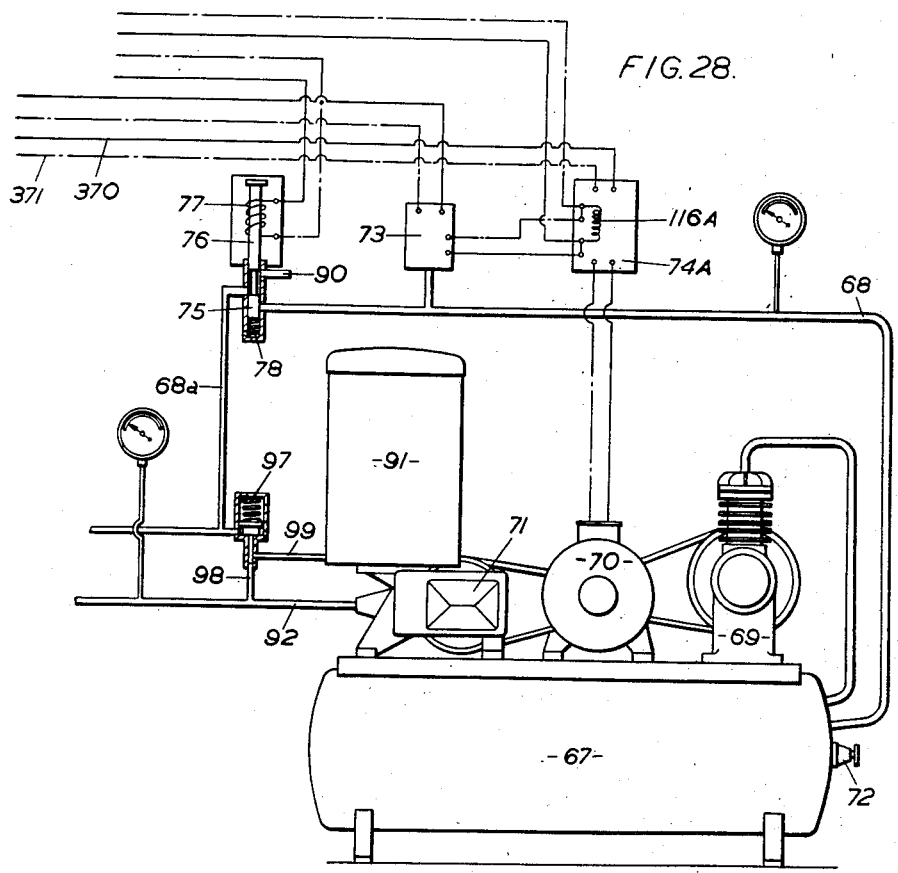

Figures 11 to 14, which are to be read together, show the wiring diagram of a modified system in which the injectors shown in Figure 10 are included, together with the control means, the switch arrangements of a number of the injectors, which are shown diagrammatically, the air container, the air compressor, the grease pump and the electric motor for driving the air compressor and the main grease pump;

Figure 15 is a sectional view of a modified form of injector which comprises a single injector lamp and two normally closed injector switches in series therewith, one switch being opened when the injector carries out a full discharge stroke, while the other is opened when the injector carries out a full charge stroke, the lamp being extinguished in either case;

Figure 16 is a section on the line 16—16 in Figure 15;

Figures 17 to 20, which are to be read together, show the wiring diagram of a second modified system in which the injectors shown in Figures 15 and 16 are included, together with the control means, the switch arrangements of a number of the injectors, which are shown diagrammatically, the air container, the air compressor, the grease pump and the electric motor for driving the air compressor and the main grease pump;

Figure 21 is a sectional view of another modified form of injector which comprises two injector lamps and two normally closed injector switches, one of which is in series with each of the said lamps and is opened when the injector completes a discharge or charge stroke the respective lamp being thereby extinguished in either case;

Figures 22 to 25, which are to be read together, show the wiring diagram of a third modified system in which the injectors shown in Figure 21 are included, together with the control means, the switch arrangements of a number of the injectors, which are shown diagrammatically, the air container, the air compressor, the grease pump and the electric motor for driving the air compressor and the main grease pump;

Figures 26 to 28, which are to be read together, show the wiring diagram of a modification similar to the first construction shown in Figs. 1–9 in which the injector lamps are normally extinguished and only illuminated when a fault is detected.

Referring first to Figures 1 to 5:

In this constructional form of the invention each injector includes a high pressure air-operated metering pump or injector comprising a hollow cylinder 1 to one end of which is fitted a pump body 2 in which an injector plunger 3 is slidable. The injector plunger is reciprocated by means described hereinafter and it is adapted to open a grease inlet port 4 in the pump body towards the end of its suction or charge stroke to the left and to close it again early in its discharge stroke to the right. The end of the injector plunger remote from the inlet port 4 is connected to the crown 5 of an air-operated piston 6 which is slidably arranged in the cylinder 1. A coil spring 7 reacts between the end of the cylinder and the inside of the piston crown 5 and urges the piston 6 and plunger 3 outwards so that the latter uncovers the inlet port.

Each injector cylinder and pump is detachably attached to a fixed injector base or body casting 11, Figures 2 to 5, to which the air and grease conduits hereinafter referred to are attached. Within the injector body 11 are formed the necessary passages for connecting the said conduits to the air and grease cylinders, and also for connecting the pump discharge passage 8 with the outlet connection 9. All these passages pass through the jointing face 27A where the detachable cylinder 1 and pump body 2 join the fixed injector body 11. There are also other passages in the injector body to accommodate electrical conductors.

Delivery of grease from the pump body 2 is made through a discharge passage 17 past a discharge valve 12, through passages 17a, 17b, 17c and 8 to an outlet connection 9 which is formed in a boss 10 projecting downwards from the fixed injector body 11, see Figures 1, 3 and 4. This outlet connection is connected by a pipe (not shown) to the place of use of the grease. For a purpose to be described later, the discharge valve 12, Figure 1, is fitted with a piston 13 provided with a sealing ring 309 and slidable in a bore 14 formed in the end of the cylinder 1, the piston and valve being urged by a spring 15 in a direction normally to hold the valve on its seat 16, which latter is arranged at the end of the discharge passage 17 connected to the open end of the pump body 2.

The amount of movement permitted to the piston 13 is preferably made capable of variation by means of detachable washers 18 inserted between the top of the piston and its cover plug because, as will be explained hereinafter, this constitutes a method of adjusting the amount of grease discharged per stroke of the plunger 3 to the place of use.

Leading into the discharge passage 8 is a subsidiary passage 19, Figure 3, having its outer end closed with a grease nipple 20. This arrangement is provided so that, in the event of a failure of the injector to function, a grease gun may be applied to the nipple and a temporary supply of grease supplied to the place of use.

A sliding buffer 21, Figure 1, loaded by a spring 302 is fitted on the side of the crown 5 of the injector piston 6 remote from the pump body 2 upon an extension 301 of the injector plunger 3 and is so arranged that it strikes a shoulder 22 formed in a recess 23 provided in a cover 24 closing the open end of the injector cylinder 1 towards the end of the injector plunger charge stroke, after the grease inlet port 4 has been uncovered by the plunger 3 but before an injector switch, referred to hereinafter, has short-circuited an injector lamp 25. The spring-loading of the buffer 21 is such that it will not collapse under the influence of the coil spring 7 acting upon the injector piston 6 and plunger 3 but will collapse under the added load when the grease supply pressure is applied to the plunger 3, as will be explained hereinafter.

Each injector body 11 is integral with the rear wall 26, the two end walls 27 and part of the bottom wall 28 of a housing 29 for the injector switches and lamp. The housing is closed by a cover 30 which comprises the top and front wall 31 and the remaining part 32 of the bottom wall of the housing. A rectangular opening is formed in the front wall of the cover and is closed by a glass panel 33, preferably coloured.

The injector switch comprises a lever 34, Figure 1, suspended in pendulum-fashion from a screw 35, the lower end 36 of the lever being bent at right angles so as to engage in a slot 37 in the wall of the injector piston 6, see Figure 4. Between its ends the switch lever is formed with two laterally projecting arms 38 and 39. Two switches are arranged on opposite sides of the lever, one of the switches comprising two flexible contact-carrying blades 40 and 41 and the other two similar blades 42 and 43. The arm 38 is so positioned that, when the lever 34 is swung into its extreme position by the piston 6, moving to the end of its charge stroke it engages the flexible blade 41, of a switch 40—41 and forces the contact carried thereon into engagement with the contact on the blade 40, thus closing the switch. Similarly, when the lever 34 is swung into its other extreme position by the piston 6, moving to the end of its discharge stroke the arm 39 engages the blade 43 of a switch 42—43 and thrusts the contact carried thereon into engagement with the contact on the blade 42 thus closing the switch.

The switch 40—41 is in an injector lamp circuit which includes the lead 46, the terminal bracket 44, lead 47, blades 41, 40, lead 48 and lead 49 which is connected to the terminal bracket 45 and lead 50. Thus, when the switch 40—41 is closed, the two lamp terminals are short-circuited and the lamp 25 is extinguished, this taking place if and when the injector piston 6 and the plunger 3 complete their stroke to the left as shown in Figure 1, i. e., the charge stroke.

Similarly, the switch 42—43 is in an injector lamp circuit which includes the lead 50, terminal bracket 45, lead 49, blades 43 and 42, leads 51 and 47, terminal bracket 44 and lead 46. Thus, when the switch 42—43 is closed the two lamp terminals are short circuited and the lamp 25 is extinguished, this taking place if and when the injector piston 6 and plunger 3 complete their stroke to the right as shown in Figure 1, i. e., the discharge stroke.

The injector lamp 25 is arranged in front of the lever and switches and behind the glass panel 33. As explained above, the arrangement of the switch lever 34 and the contacts with which it cooperates is such that when the lever is moved by the injector piston 6 to either end of its travel it closes a switch and thus short-circuits the two lamp terminals, so that current passing through the circuit does not pass through the lamp and the latter is extinguished. If, however, the injector piston 6 and plunger 3 fail to complete their mutual full stroke in either direction, the switch will not be closed and the injector lamp will not be short-circuited and consequently will remain illuminated.

Each of the injector bodies 11 is formed with longitudinal passages 52 and 53, Figures 2 to 5, for air and grease respectively which extend from connections 54 and 55 formed in one end of the body to connections 56 and 57 formed in the opposite end.

As shown in Figure 8, the longitudinal air and grease passages 52 and 53 of the injector bodies in the system are connected in series by lengths 58 and 59 of air and grease-conveying hose respectively, which in turn are connected to sources of supply of air and grease.

The longitudinal air passage 52 in each injector body 11 is connected by subsidiary passages 60, 61 and 62 to the space 63, Figure 1, formed between the cover 24 closing the open end of the injector operating cylinder 1 and the crown 5 of the injector piston 6.

The longitudinal grease passage 53 in each injector body 11 is connected by subsidiary passages 64 and 64a to the inlet port 4 of the pump body and also by passages 65 and 65A to the space 66 above the discharge valve piston 13, so that in certain circumstances the valve 12 is held upon its seat 16 by the pressure of the grease as will be explained hereinafter.

The said compressed air source for operating the pistons 6 of all the injector devices in the system comprises a container 67, Figure 9, which is connected by a main air duct 68 and main air line 68a to the air conveying hose 58 and which is fed with air from an air compressor 69, which latter is preferably driven from a single phase electric motor 70 which also serves to drive a main grease pump 71. A relief valve 72 on the air container is set to blow off at a predetermined pressure (say 30-lbs. per square inch) and there is also a pressure-operated switch 73 which is associated with the main air duct 68 leading from the container and which, acting in conjunction with the motor starter 74, serves to start the motor and keep it running to maintain a minimum pressure of, say, 25-lbs. per square inch in the container, this control being independent of other controls which will be described hereinafter.

The supply of air from the container 67 via the main air duct 68 to the said air line 68a and to the air operated injector pistons 6, is controlled by a main air valve 75 which is operated by the bore 76 of a solenoid 77 in such a manner that when the solenoid is energised the valve is pulled downwards into such a position that the main air container 67 is put into communication with the air lines 68a and 58 and thus with the pistons 6 of all the injectors, the exhaust connection 90 being cut off, and when the solenoid is de-energised, the main valve is thrust upwards by the spring 78 into a position in which the supply of compressed air to the said air line 68a is cut off and the cylinders are all put into communication with the atmosphere via the air line 68a and the exhaust connection 90.

The grease supply source comprises the main grease pump 71 which is driven by the same motor as the air compressor 69, and having its starting device relay operated by means of a solenoid incorporated in a charge circuit which will be described hereinafter.

The main grease pump draws its supply from a container 91 and delivers the grease under pressure through a main grease line 92 to the grease-conveying hose 59 connecting with all the injector devices.

The main grease line 92 is fitted with a spring-urged grease relief valve which comprises a plunger 94 slidable in the bore of a hollow body 95 and arranged to cover and uncover an outlet port 95A. This plunger is attached to a piston 96 which is slidable in a bore of larger diameter in the same body. The piston and plunger are urged by a spring 97 acting on the top of the piston downwards past the outlet port 95a so that the plunger closes the latter. The bottom end of the plunger is exposed to the pressure of grease in the said main grease line 92 through a branch pipe 98 and the load on the spring 97 on the top of the piston is such that it requires a pressure of, say, 400 lbs. per square inch to open the outlet port.

The outlet port is connected by an escape pipe 99 to the grease container 91 so that grease delivered by the pump in excess of requirements is returned to the container.

A compressed air inlet port 100 is formed in the grease relief valve casing below the piston 96 and is connected to the main air line 68a at a point between its connection to the air-conveying hose 58 and the casing of the main air control valve 75 in such manner that the cyclical changes of air pressure as applied to the injector pistons 6 by the said control valve are also applied to the under side of the piston 96 of the grease relief valve.

For a reason to be explained hereinafter, the respective diameters of the piston 96 and plunger 94 of the grease relief valve are so arranged that, when the operating air pressure acts upon the underside of the piston, the piston and plunger are moved upwards against the opposing pressure of the piston spring 97, thus opening the outlet port 95A and relieving the grease charging pipe 92 of all pressure.

Electrical system

Figure 6:
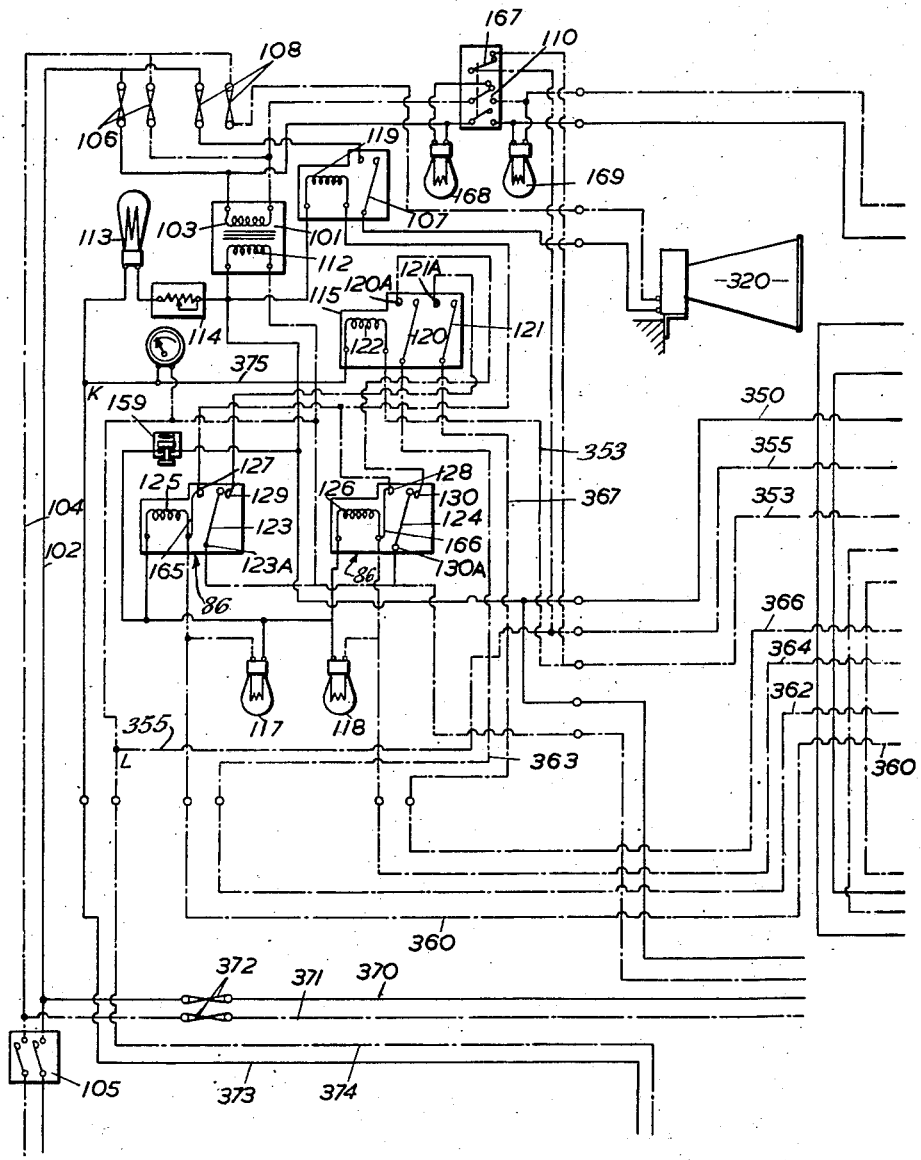

In the constructional form of the invention now being described electrical energy is supplied from the mains 102 and 104 at normal voltage and is stepped down by means of a transformer 101, Figure 6, to 50 volts to suit the requirements of this particular embodiment.

Primary circuits

The electrical system comprises four primary circuits which are referred to hereinafter as the "transformer primary," the "horn circuit," the "control motor circuit" and the "main grease pump motor circuit."

For convenience in the description which follows the two supply mains and the two sides of the secondary circuits referred to hereinafter are distinguished by the usual conventional terms "positive" and "negative" used in association with continuous current, although it is recognized that they are not strictly correct as applied to alternating current.

For convenience, the positive mains and conductors are shown in full lines in the drawings and the negative mains and conductors are shown in broken lines.

Transformer primary circuit

The transformer primary circuit runs from the positive main 102 through the primary winding 103 of the transformer and back to the negative main 104, the two parts of the circuit passing through a double-pole main switch 105 and a pair of fuses 106 in the usual manner.

Horn circuit

The horn circuit runs from the positive main 102 through a relay operated switch 107 to the winding of the horn 320 and back to the negative main 104, the two parts of the circuit passing through the double pole main switch 105 and pair of fuses 108 as described above.

Control motor circuit

The control motor circuit runs from the positive main 102 through the winding of the control motor 109, Figure 7, and back to the negative main 104, the two parts of the circuit including the double pole main switch 105 and the fuses 106 as described above. In addition, however, a double pole switch 110 is inserted in the circuit by which the control motor may be isolated for a purpose to be described hereinafter.

Main grease pump circuit

The main grease pump circuit runs from the positive main 102 to the grease pump motor and starter 74, Figure 9, and back to the negative main 104, the two leads 370 and 371 of the circuit passing through a pair of fuses 372 and being controlled by the double pole main switch 105 as described above.

Secondary circuits

Several secondary circuits are taken from the transformer 101, and these are referred to hereinafter as the "injector lamp circuit," the "detector circuit," the "discharge circuit," the "charge circuit," the "discharge test circuit," the "charge test circuit" and the "horn relay circuit" respectively.

Injector lamp circuit

The injector lamp circuit runs from the positive side of the secondary winding 112, Figure 6, of the transformer 101 through the variable resistance 114, barretter 113 to the junction K and via lead 373 to the lamps 25 of the injectors which are connected in series, and back by the lead 374 to the junction L connected to the negative side of the transformer secondary winding. When the system is functioning correctly and all the injector lamps 25 are short-circuited by the injector switches 40, 41 and 42, 43, as previously explained, this circuit will have no resistance and will, in effect, constitute a short-circuit across the transformer. To prevent the rush of current, which would normally ensue under such circumstances, a barretter 113 having, for instance, the characteristic of 0.62 amp. from 15-45 volts, and also a variable resistance 114 of 0-20 ohms, and capable of carrying one ampere of current, are arranged in series in the circuit.

Detector circuit

The detector circuit runs from the positive side of the transformer secondary 112 through the variable resistance 114 and barretter 113 to the junction K which is connected by a conductor 375 to the detector means 115, which in turn is connected by a conductor 353 to the control means 85, which will be described hereinafter, for controlling the sequence of operation of the system, and back by the conductor 355 to the junction L at the negative side of the transformer secondary, the detector and control means being in parallel with the injector lamps 25 of the injector circuit.

*Discharge circuit*

The discharge circuit runs from the positive side of the transformer secondary 112, Figure 6, through the said control means 85, through the solenoid 77, Figure 9, of the main air control valve 75 and back through a lead 353 to the negative side of the transformer secondary 112.

*Charge circuit*

The charge circuit runs from the positive side of the transformer secondary 112 through the said control means 85 to the solenoid 116 of the grease pump motor starter 74 and back to the negative side of the transformer secondary 112.

*Discharge test circuit*

The discharge test circuit runs from the positive side of the transformer secondary 112 through the discriminator means 86, Figure 6, to the control means 85 and through detector means 115 and the discriminator means 86, which are referred to hereinafter, back to the negative side of the transformer secondary.

*Charge test circuit*

The charge test circuit runs from the positive side of the transformer secondary 112 through a charge tell-tale lamp 118, Figure 6, to the control means 85 and through the detector means 115 and the discriminator means 86 and back to the negative side of the transformer.

*Horn relay circuit*

The horn relay circuit runs from the positive side of the transformer secondary 112 through the solenoid 119 which operates the horn switch 107, to the discriminator means 86 and back to the negative side of the transformer secondary.

*Detector*

In this construction, the detector means 115, Figure 6, takes the form of a relay which comprises two electrically separate single-pole switches 120 and 121, mechanically bridged together and actuated by a single solenoid coil 122 which is hereinafter referred to as the "detector solenoid."

When the detector solenoid coil 122 is energised the two switches 120 and 121 (which are referred to hereinafter respectively as "detector discharge switch" and "detector charge switch") are closed and when the solenoid is not energised the two switches are automatically opened. The detector solenoid coil 122 is included in the detector circuit and together with the control means 85 is in parallel with part of the injector lamp circuit from the junction K to the junction L being thus bridged across the injector lamps, but it is in series with the variable resistance 114 and the barretter 113.

It will be obvious that when all the injector lamps 25 are short-circuited by the injector switches 40, 41 or 42, 43, as previously explained, the potential difference across their several terminals will be zero, or very nearly so. Hence, the potential difference throughout the length of this part of the injector lamp circuit will also be small; so small that not sufficient current will pass through the detector solenoid 122 to energise it and hence the two detector switches 120 and 121 will remain open.

If, however, any one injector plunger 3 fails to complete its working stroke, that particular switch will not be closed and that particular lamp will not be short circuited and its resistance will be interposed into the circuit and a potential difference created. This potential difference will cause a current to flow through the detector solenoid 122 keeping it energised and causing the two detector switches 120 and 121 to remain closed. If two injector lamps 25 should light up simultaneously the resistance interposed into the circuit will be twice as much and normally the current then passed through the solenoid 122 would also be twice as much. The maximum potential difference which, however, can thus be applied to the detector solenoid is the 50 volts given by the transformer secondary 112 and the solenoid is wound so as to be capable of accepting this.

*Discriminators*

The discriminator means 86 takes the form of two relays. These discriminator relays each comprise a single-pole switch 123 or 124, Figure 6, each having two positions and actuated by a solenoid coil 125 or 126, the arrangement being such that, when either solenoid is energised the respective switch is pulled into a position where it contacts the terminal 127 or 128 in the horn relay circuit, thereby closing the circuit. Each of these terminals is hereinafter referred to as a "horn terminal." When the solenoids are not energised, however, the switches contact terminals 129 or 130 (hereinafter referred to as the "detector terminals") which are directly connected with the detector switches. As mentioned above, there are two discriminator relays and their switches are connected one in series with each of the two switches 120 and 121 of the detector relay 115. The discriminator relay coils 125 and 126 will be referred to hereinafter respectively as the "discharge discriminator solenoid" and the "charge discriminator solenoid" and they are incorporated in the discharge test circuit and charge test circuit respectively. The discriminator switches 123 and 124 associated with these solenoids will be referred to hereinafter respectively as the "discharge" and "charge" discriminator switches respectively, but it should be noted that, for a purpose explained hereinafter, the detector terminal 130 of the charge discriminator switch 124 is connected to a terminal 120A of the discharge detector switch 120 and the detector terminal 129 of the discharge discriminator switch 123 is connected to a terminal 121A of the charge detector switch 121.

*Electric control mechanism*

The above mentioned control means 85, which controls the sequence of operations of the system, takes the form of a mechanism comprising one or more shafts carrying cams which serve to make and break the electrical circuits, as will be described hereinafter. As shown in Figure 7, the mechanism includes a main cam shaft 131, hereinafter referred to as the "cycle shaft," which rotates once in a minute and is driven through a free-wheel clutch 132 by a synchronous electric motor 109, which has already been referred to as the control motor, and is included in a primary circuit.

One complete cycle of operations of the system comprises the following: discharge stroke, discharge test, charge stroke, and charge test. This cycle is performed during one revolution of the cycle shaft 131 and thus lasts 60 seconds.

Usually, it is neither necessary nor desirable that a cycle of operations should be performed at every revolution of the cycle shaft 131, i. e., every minute. Hence, a second shaft 132, hereinafter referred to as the "frequency shaft," carrying similar cams and driven at a reduced speed by gearing 133, 134 from the cycle shaft, serves as a frequency control. If, for instance, it is desired that one cycle of operations, taking one minute to perform, shall be performed once in every five minutes, then the frequency shaft will be driven at one fifth of the cycle shaft speed, i. e., at one revolution in five minutes.

Discharge circuit control switches

Upon the cycle shaft 131 is mounted a pair of spiral-shaped cams 135 and 136, Figure 7. The cam 135 (hereinafter called the "discharge quick make cam") has a "base" sector 135A of constant radius of about 180 degrees, a slow rise 135B of gradually increasing radius of about 90 degrees and a "top" sector 135C of constant radius of about 90 degrees, at the end of which latter sector there is a sudden drop 135D back to the beginning of the base sector.

Associated with the cam 135 is a flexible follower 137 which thus during one revolution of the cycle shaft remains in its normal unflexed condition for rather more than 180 degrees (say 200 degrees), is then thrust slowly away from the cycle shaft during, say, 70 degrees, is held in its fully flexed position for 90 degrees, and is then permitted to drop suddenly on to the base sector.

The follower 137 forms part of a switch 138, hereinafter referred to as the "discharge quick make switch" arranged in such a manner that contact is held for rather more than half a circle of arc, i. e., the aforesaid angle of 200 degrees, the sudden drop of the follower from the top 135C to the base sector 135A of the cam effecting an instantaneous making of contact, which is necessary in order to avoid sparking. It will be appreciated that for mechanical reasons it is impossible to effect an equally instantaneous break by means of the same cam and switch, hence in order that this may be done a second cam and switch are introduced.

This cam 136, hereinafter referred to as the "discharge quick break cam," is of similar formation to the discharge quick make cam but it has a base sector 136A of constant radius of about 90 degrees, a slow rise 136B of gradually increasing radius of about 90 degrees and a top sector 136C of constant radius of about 180 degrees with a sudden drop 136D back to the beginning of the base sector.

Associated with the cam 136 there is a flexible follower 139 which thus remains in its normal un-flexed condition for rather more than 90 degrees (say 110 degrees), is then thrust slowly away from the cycle shaft during, say, 70 degrees and is held in its fully flexed position for 180 degrees and is then permitted to drop suddenly on to the base sector. The follower 139 is associated with a switch 140, hereinafter referred to as the "discharge quick break switch" which is arranged in such a manner that contact is held for rather more than the said 180 degrees corresponding to the top sector of the cam 136C, being made slowly during the said slow rise, and broken quickly by the said sudden drop 136D.

Both the cams 135 and 136 are capable of angular adjustment relative to one another about the axis of the cycle shaft 131 and the switches 138 and 140 associated with them are both incorporated in the discharge circuit. These two switches, which, where the context permits, will be hereinafter referred to collectively as the "discharge switches" are connected in series with each other in such a manner that only when both switches are closed is the discharge circuit completed so that a current can flow. The cams 135 and 136 are set such that the following sequence of events takes place, the times quoted in seconds being taken from the commencement of the discharge stroke of the injector plungers 3:

(a) With the circuit open and no current flowing; slow make by the quick break switch 140 prior to 0 secs.

(b) With the circuit still open and no current flowing; quick make by the quick make switch 138 at 0 secs.

(c) With the circuit now closed and current flowing; quick break by the quick break switch 140 at 30 secs.

(d) With the circuit now open and no current flowing; slow break by the quick make switch 138 subsequent to 30 secs.

It will be noted that the discharge circuit is thus completed during the period 0–30 seconds and that it is both closed and opened by quick action and that the slow make or the quick break switch 140 and slow break of the quick make switch 138 take place in open circuit when no current is flowing. Hence, sparking at the contacts is avoided.

Charge circuit control switches

Two other cams 145 and 146 (hereinafter called "charge quick make" and "charge quick break" cams) constructed like the said discharge quick make and discharge quick break cams 135 and 136, are also mounted on the cycle shaft 131 and they are associated respectively with flexible followers 147 and 148 and switches 149 and 150, which latter will be referred to hereinafter individually as the "charge quick make switch" and the "charge quick break switch" respectively and, where the context permits, collectively as the "charge switches."

The two charge cams 145 and 146 are capable of angular adjustment relative to each other and also relative to the aforesaid discharge cams 135 and 136 and they are set so that a similar sequence of events takes place, the two switches 149 and 150 being closed and the circuit completed during the second half-revolution of the cycle shaft 131 i. e., from 30 to 60 seconds, and the circuit being again opened and closed by quick action while the slow make and slow break take place outside this period when the circuit is open and no current flowing.

Discharge test circuit switches

A further cam 154, hereinafter referred to as the "discharge test quick make cam," is mounted upon the said cycle shaft 131. This cam is associated with a follower 156 and switch 158 of the same type as those previously described and is arranged to give the quick make and slow break characteristics of the said charge and discharge quick make switches referred to above, but the spacings of the base and top sectors are different from those of the last mentioned cams and they are arranged to give shorter periods of contact. This cam is capable of angular adjustment relative to the said charge and discharge cams 145, 146 and 136, 135 and is set so that its switch 158, hereinafter referred to as the "discharge test quick make switch" effects its quick make at 22½ secs. of the cycle shaft rotation and its slow break subsequent to 30 seconds.

A further switch 151, hereinafter referred to as the "discharge test quick break switch," is mechanically associated with the said discharge quick break switch 140, being actuated by the follower 139 associated with the discharge quick break cam. Since the discharge test quick break switch 151 is associated with the discharge quick break switch 140, these two switches will carry out their quick break simultaneously, i. e., at 30 seconds of the cycle. The discharge test quick make and discharge test quick break switches 158 and 151, hereinafter referred to collectively, where the context permits, as the "discharge test switches" are included in the discharge test circuit, which will be described hereinafter.

It will thus be seen that the discharge test circuit is closed from 22½–30 secs. and, as before it is closed and opened by quick action and the slow make and slow break take place on open circuit.

Charge test circuit switches

A further cam 153, hereinafter referred to as the "charge test quick make cam" is mounted upon the said cycle shaft 131. This cam is associated with a follower 155 and switch 157 of the same type as those previously described and is arranged to give the quick make and slow break characteristics of the said discharge quick break switch. This cam is capable of angular adjustment relative to the other cams aforesaid and is arranged to effect its quick make at 52½ seconds of the cycle shaft rotation and its slow break subsequent to 60 seconds.

A further switch 152, hereinafter referred to as the "charge test quick break switch" is mechanically associated with the said charge quick break switch 150, being actuated by the follower 148 associated with the charge quick break cam. Since the charge test quick break switch 152 is associated with the charge quick break switch 150, these two switches will carry out their quick break simultaneously, i. e., at 60 seconds of the cycle. The charge test quick make and charge test quick break switches 157 and 152, hereinafter referred to collectively, where the context permits, as the "charge test switches" are included in the charge test circuit, which will be described hereinafter.

It will thus be seen that the charge test circuit is closed from 52½–60 secs., and, as in the case of the discharge test circuit, it is closed and opened by quick action and the slow make and slow break take place on open circuit.

Frequency switches

Upon the frequency shaft 132, is mounted a pair of cams 143 and 144, having the same characteristics as those previously described in conjunction with the cycle shaft and referred to hereinafter as the "frequency quick make" and "frequency quick break" cams respectively. Associated with these two cams are a pair of flexible followers and switches 141 and 142 which are of the same type as those previously described and are referred to hereinafter individually as the "frequency quick make switch" and the "frequency quick break switch" respectively, and collectively as the "frequency switches."

The "frequency quick make" and "frequency quick break" cams 143 and 144 are set so that quick break cams 143 and 144 are set so that the two frequency switches 141 and 142 are closed during one complete revolution of the cycle shaft, commencing at 0 secs. and finishing at 60 secs., the arrangement again being such that the circuit is closed and opened by quick make and quick break, so that no sparking occurs.

These two switches 141 and 142 are introduced into the negative main from the transformer secondary 112 in series with the discharge, charge and detector circuits, each of which pass through them as previously explained.

Discharge circuit

Referring to Figures 6 and 7, the positive side of the secondary 112 of the transformer 101 is connected by a lead 350 to one contact of the discharge quick make switch 138 on the cycle shaft 131 and the other contact of that switch is connected by a lead 351 to one contact of the discharge quick break switch 140 on the cycle shaft. The remaining contact of the last mentioned switch is connected by a lead 352 to one side of the solenoid coil 77, Figure 9, of the above mentioned solenoid operated, main air control valve 75, the other side of the said solenoid coil being connected by the leads 353 and 354 to the frequency switches 141 and 142 which are in turn connected by the lead 355 to the junction L at the negative side of the transformer secondary.

Charge circuit

The positive side of the secondary 112 of the transformer is connected by the said lead 350 and a lead 356 to one contact of the charge quick break switch 150 and the other contact of that switch is connected by the lead 357 to one contact of the charge quick make switch 149. The remaining contact of the last mentioned switch is connected by the lead 358 to the solenoid 116 of the grease pump motor starter 74, and by the leads 359 and 354 to the said frequency switches 141 and 142 which are connected by the lead 355 to the junction L at the negative side of the transformer secondary.

Discharge test circuit

This discharge test circuit runs from the positive side of the transformer secondary 112 to a push-button re-set switch 159, Figure 6, and to the discharge discriminator solenoid 125. The negative side of the latter is connected by a lead 360 to one contact of the discharge test quick make switch 158. The other contact of that switch is connected by a lead 361 to one contact of the discharge test quick break switch 151, the other contact of which is connected by the leads 362 and 363 to the above mentioned detector discharge switch 120, Figure 6, the other terminal 120A of which is connected to a detector terminal 130 of the said charge discriminator switch 124. The other terminal 130A of the latter is connected to the negative side of the transformer secondary 112. The discharge tell-tale lamp 117 is shunted across the discharge discriminator solenoid 125 so that when the circuit is closed the current flows in parallel through the two.

Charge test circuit

The charge test circuit runs from the positive side of the transformer secondary 112 as above mentioned to the push re-set switch 159, Figure 6, and to the charge discriminator solenoid 126. The negative side of the latter is connected by a lead 364 to one contact of the charge test quick make switch 157, the other contact of which is connected by a lead 365 to one contact of the charge test quick break switch 152. The other contact of the latter is connected by leads 366 and 367 to the said detector charge switch 121 (Figure 6) the other terminal 121A of which is connected to the detector terminal 129 of the discharge discriminator switch 123, the other terminal 123A of which is connected to the negative side of the transformer secondary 112. The charge tell-tale lamp 118 is shunted across the charge discriminator solenoid 126 so that when the circuit is closed current flows in parallel through the two.

*Manual testing of control mechanism*

For the purpose of testing the operation of the system, means are provided whereby the control mechanism can be tested by hand. Referring to Figure 7, this comprises a small subsidiary shaft 160 (hereinafter referred to as the "manual shaft") carrying a hand knob 161 or crank whereby it may be rotated. The manual shaft is geared to the cycle shaft 131 with a reduction ratio of three to one, which affords a convenient ratio whereby the cycle shaft may be rotated slowly by hand. Upon the manual shaft is mounted a ratchet-wheel 162 which, by engagement with a pawl 163, prevents the mechanism being accidentally rotated in the reverse direction.

At one end of the cycle shaft is mounted an index pointer 164, which, co-operating with a dial 165 marked: "Discharge," "Discharge test," "Charge" and "Charge test," enables the operator to see the position of the gear, which, normally being enclosed, will otherwise be invisible.

*Operation of the system*

When it is desired to put the system into operation the main switch 105 is first closed. This starts up the motor 109 driving the control mechanism 85 which will run continuously until stopped. It also starts up the motor 70, which drives the grease pump 71, and the air-compressor 69 which will run until a predetermined pressure of say 25-lbs. per square inch has been built up in the receiver 67, at which point the pressure switch 73 will come into operation and cut out the motor 70.

During this operation, the grease pump 71, will have pumped into the system such grease as it will accept to charge the pipes, passages, etc. and any excess will have been discharged through the relief valve 94, and escape pipe 99, back to the supply tank 91.

Thereafter the operation of the system is as follows:

*Discharge stroke*

At 0 secs., the discharge quick make switch 138, Figure 7, makes its contact, closing the discharge circuit (which remains closed until 30 seconds), the main air valve solenoid 77, Figure 9, is energised and air pressure is admitted to all the injector pistons 6 which immediately move forward, simultaneously thrusting the pump plungers 3 before them on their discharge strokes.

During this operation air pressure from the main air duct 68a, Figure 9, is also admitted to the space below the piston 96 on the relief valve 94 of the grease supply source. This, as previously explained, lifts the relief valve causing the lowering of the grease pressure in the grease supply line 92 to zero. Thus, pressure is relieved from the pistons 13 of the injector discharge valves 12, which are consequently free to lift, and thus there is no detraction from the full force of the injector pumps which, consequently, is available for delivery of grease to places of use.

It will be appreciated that part of the volume of the injector pump delivery will be absorbed in thus lifting the discharge valve piston 13 and that the volume of grease so used will not reach the place of use. Hence, by varying the amount of lift permissible by the insertion or removal of washers 18, the amount of grease so used can be varied. The variation of the piston lift therefore affords a ready means of varying the net volume delivered by the injector to the place of use. During this discharge operation the electrical fault detector apparatus will function as follows. While the injector pistons are in motion, i. e., are in some position intermediate the two ends of their strokes, the injector switches 40, 41 and 42, 43 will be open and the injector lamps 25 will not be short-circuited, and consequently they will light up. The detector solenoid 122 also will be energised and the two detector switches 120 and 121 closed. This, however, is inconsequential because the discharge and charge test switches, with which they are in series, are at this time open. As each injector plunger 3 completes its stroke its particular switch makes contact, short-circuiting and extinguishing its particular lamp. Thus, if the apparatus is functioning correctly all the injector pistons and plungers will complete their discharge strokes in between say 10–15 seconds or possibly less, all the injector lamps will be extinguished, the detector relay 122 will be de-energised and the detector switches opened.

If, on the other hand, any one or more injector pistons and plungers fail to complete their stroke, that particular injector lamp 25 will remain illuminated after the others have gone out, the detector solenoid 122 will remain energised and the two detector switches 120 and 121 will remain closed.

*Discharge test*

At 22½ seconds, as previously explained, the discharge test quick make switch 158 makes its contact, completing the discharge test circuit (which remains closed until 30 seconds). If any one or more of the injector pistons 6, and plungers 3, has or have by that time still failed to complete its or their discharge stroke, or strokes, that particular injector switch 42, 43, will have failed to short-circuit the particular lamp 25, with which it is associated, and this lamp will accordingly remain illuminated as previously explained, the detector solenoid 122 will have remained energised and the detector switches 120 and 121 will have remain closed.

This has no effect as far as the charge test circuit is concerned, because at this phase of the cycle the charge test switches 157 and 152 are both open, but in the discharge test circuit, because the detector discharge switch is already closed, the closing of the discharge test quick make switch 158 completes the circuit. Current then flows through the discharge test circuit, lighting up the discharge tell-tale lamp 117 and energising the discharge discriminator solenoid 125 which pulls the discharge discriminator switch 123 over from the detector terminal 129 on to the horn terminal 127, thus also completing the horn relay circuit. The horn relay 119 then closes the horn switch 107 thus completing the horn circuit and sounding the horn 320.

A connection 165 from the negative end of the discharge discriminator solenoid 125 to the horn terminal enables the current flowing through the solenoid to pass via the discriminator switch 123 direct to the negative side of the transformer secondary 112 without going through the discharge test switches 158 and 151. Hence, when the discharge test circuit is opened by the breaking of the discharge quick break switch 151 a few seconds later (at 30 secs.) it does not open the circuit through the solenoid which consequently will not be de-energised. The horn relay circuit once made will, therefore, remain made and the horn 320 will continue to sound until stopped by the attendant. This can be effected by pressing the aforesaid re-set push-button switch 159 situated in a part of the positive main common to the charge and discharge circuits. This opens the circuit, extinguishes the tell-tale lamp 117, de-energises the discharge discriminator solenoid 125 and returns everything to statu quo ante.

If, on the other hand, all the injector plungers 3 have completed their strokes, all the injector lamps 25 will be short-circuited, as previously explained. There will be no potential difference across the detector solenoid 122, which will thus remain de-energised and the detector discharge switch 120 and the detector charge switch 121 will consequently remain open leaving the discharge test circuit open. Hence, the discharge tell-tale lamp 117 will not light up and the horn 320 will not sound.

At 30 seconds the discharge quick break switch 140 and the discharge test quick break switch 151 both break their contacts simultaneously. The breaking of the discharge test quick break switch breaks the discharge test circuit, which, unless a fault has been detected as previously explained, is then ready for the next discharge test.

*Charge stroke*

At 30 seconds, simultaneously with the opening of the discharge quick break switch 140 and the discharge test quick break switch 151, the charge quick make switch 149 makes its contact, closing the charge circuit (which remains closed until 60 seconds). The breaking of the discharge quick break switch 140 opens the discharge circuit, de-energises the said main air valve solenoid 77 the core 76 of which accordingly moves back, under the influence of its spring 78 into the position where the pressure air from the air container 67 is shut off from the main air line 68a and the injector pistons 6 are exposed to the atmosphere through the air outlet 90 from the main air valve. The injector pistons 6 will then return under the influence of their springs 7 causing a void to be formed in the pump chambers 2.

The closing of the charge circuit causes the main grease pump motor starter 74 to be energised thus closing switches and starting the motor and the pump 71. The grease under a pressure of 400 lbs. per square inch (as limited by the relief valve 94 as previously explained) is then forced forward through the aforesaid grease ducts and hose to the bodies 2 of all the injector pumps which, however, it does not immediately enter.

Since the grease pressure is also applied to the upper side of all the injector discharge valve pistons 13 these with their discharge valves 12 will descend until the valves re-seat themselves. The grease below the pistons which is displaced by this movement will be returned to the pump chambers and will follow the pump plungers 3, filling the aforesaid void until the discharge valves 12 are reseated.

Thereafter, the plungers will continue to move on their return strokes causing a further void until the aforesaid buffers 21 contact their stops 22 on the cylinder cover 24. By this time, however, the grease inlet ports 4 have been uncovered by the plungers so that fresh grease under pressure from the supply source then enters through the inlets 4, fills the remaining void and charges the pumps with a fresh supply, building the pressure up to that of the grease supply line. Since, however, the grease pressure has already been applied to the upper sides of the discharge valve pistons 13 the discharge valves 12 which have already seated themselves as previously explained, will be held in the closed position so that no unmetered grease will be permitted to pass to the places of use.

As soon as the pressure in the pump chambers builds up, the added load on the pump plungers 3, due to the pressure of the grease on the ends of the plungers, as already explained, is sufficient to overcome the thrust of the spring 302 on the piston buffers 21 which, therefore, collapse and allow the pistons 6 and the plungers 3 to complete their charge strokes.

It will be noted that the amount of fresh grease entering each injector pump from the supply source is the swept volume of the pump less the amount thrust back by the movement of the discharge valve piston 13. Hence, by varying the amount of the movement of the piston and thereby the amount of grease returned, the amount accepted from the grease source and ultimately delivered to the place of use may be varied.

The completion of the injector charge strokes serves to close the switches 40—41 and short-circuit the injector lamp terminals, as previously explained and, it should be noted, this only takes place if the pumps have not only completed their charge strokes but also have been replenished with grease up to the full working pressure.

If the apparatus is functioning satisfactorily the return or charge strokes, commenced under the influence of the injector piston springs 7 and finished by the charging of the pumps with the incoming grease under pressure, should be completed in anything between, say, 10–15 secs. and possibly less.

It should be noted that, during the period of the charge stroke (from 30 to 60 secs.) while the main grease pump 71 is running, the air compressor 69 which is driven by the same motor 70, is also running and thus replenishing the air receiver 67 with air to replace the air used in the previous discharge stroke, any air in excess of requirements being discharged through the air relief valve 72 in the normal manner.

During the charge operation the electrical fault detector apparatus will function as already described in reference to the discharge operation, viz., while the injector pistons and plungers are in motion the injector lamps 25 will all light up and the detector solenoid 122 will be energised. As each injector piston and plunger completes its stroke that particular lamp will be short-circuited and extinguished, thus, if all complete their strokes all the lamps will be extinguished and the detector solenoid de-energised. This should take place in 10–15 seconds as previously described. If, however, one or more of the pistons and plungers fail to complete their mutual strokes the associated lamp or lamps will remain alight, the detector solenoid will remain energised and the detector switches closed.

*Charge test*

As previously explained, at 52½ secs., i. e.,

22½ secs. after the charge stroke commenced, the charge test quick make switch 157 makes its contact, completing the charge test circuit (which remains closed until 60 secs.). If any one or more of the injector pistons 6 and plungers 3 has, or have, by that time failed to complete its, or their, charge stroke or strokes, that particular injector switch 40—41 will have failed to short-circuit the particular lamp 25 with which it is associated and this lamp will accordingly remain illuminated as previously explained, the detector relay solenoid 122 will have remained energised and the detector discharge and charge switches 120 and 121 will have remained closed.

This has no effect as far as the discharge test circuit is concerned because at this phase of the cycle the discharge test switches 158 and 151 are both open, but in the charge test circuit, because the detector charge switch is already closed, this closing of the charge test quick make switch 157 completes the circuit.

Current then flows through the charge test circuit lighting up the charge tell-tale lamp 118 and energising the charge discriminator solenoid 126 which pulls the charge discriminator switch 124 over from the detector terminal 130 on to the horn terminal 128, thus also completing the horn relay circuit. The horn relay 119 then closes the horn switch 107, thus completing the horn circuit and sounding the horn 320.

A connection 166 from the negative end of the charge discriminator solenoid 126 to the horn terminal 128 enables the current flowing through the solenoid to pass via the discriminator switch 124 direct to the negative side of the transformer secondary 112 without going through the charge test switches 157 and 152. Hence, when the charge test circuit is opened by the breaking of the charge quick break switch 152 a few seconds later (at 60 secs.) it does not open the circuit through the solenoid which consequently will not be de-energised. The horn relay circuit once made will, therefore, remain made, and the horn 320 will continue to sound until stopped by the attendant pressing the aforesaid re-set push-putton switch 159 as previously explained.

If, on the other hand, all the injector plungers 3 have completed their strokes, and the charging of the pumps is also completed, all the injector lamps 25 will be short-circuited as previously explained. There will be no potential difference across the detector solenoid 122 which will thus remain de-energised and the detector charge and discharge switches 120 and 121 will consequently remain open leaving the charge test circuit open. Hence, the said charge tell-tale lamp 118 will not light up and the horn will not sound.

It will be appreciated, however, that, whereas in the event of a fault being detected the horn relay circuit once made remains made and the horn 320 sounds continuously until stopped by the attendant as previously explained, this does not apply to the injector lamps 25 and tell-tale lamp 117 or 118, which, by the further rotation of the cycle shaft 131, will be extinguished again as soon as the test circuit in question (either discharge or charge) is broken i. e., at 30 or 60 secs. respectively.

At 60 secs. the charge quick break switch 150 and the charge test quick break switch 152 both break their contacts simultaneously. The breaking of the charge quick break switch opens the charge circuit and stops the lubricant pump motor 71. The opening of the charge test quick break switch 152 breaks the charge test circuit, which, unless a fault has been detected as previously explained, is then ready for the next charge test.

Simultaneously with the above, i. e., at 60 seconds of the completed cycle of operations and at 0 seconds of the new cycle; the discharge quick make switch 138 makes its contact and thereby starts the whole cycle again. This, however, will not actually take place immediately, because the aforesaid frequency control cams 143 and 144 and switches 141 and 142 act to cut out the discharge, charge and detector circuits and render the apparatus inoperative until they cut them in again, which in this construction occurs at every fifth cycle of the cycle shaft 131.

Should a fault occur it is undesirable to have to wait for a recurrence of the action cycle as governed by the frequency control. Hence, for the purpose of ascertaining the nature of a fault, i. e., which injector is defective and upon which stroke (charge or discharge) it has failed, as mentioned above, means are provided for the temporary manual operation of the control mechanism whereby the mechanism can be turned by hand into the various test positions.

In order that this may be done it is necessary to switch off the control motor 109, this being done by opening the aforesaid double-pole control motor switch 110 and, at the same time, it is also necessary to short-circuit the frequency switches 141 and 142 so that the long delay between action cycles is cut out. This is accomplished by a third single-pole switch 167 mechanically attached to the control motor switch 110 but electrically separate therefrom, which closes when the motor switch is open and vice versa. A pair of signal lamps 168 and 169, preferably of different colours, are bridged across the circuits in such a manner as to show whether the motor switch is in the motor-operated or manually-operated position.

Having shut off the control motor 109 the operator then slowly rotates the cycle shaft 131 by means of the manual shaft 160 and the hand knob 161 into each of the four positions, viz., discharge, discharge test, charge and charge test. In one of these positions the horn 320 will re-commence to sound and one tell-tale lamp 117 or 118 and one injector lamp 25 will light up, giving the necessary information, i. e., whether the fault occurred in the discharge or charge stroke and in which injector it occurred. The horn can then be silenced by means of the re-set push button switch 159 and the pump body 1 of that particular injector which is defective can then be removed and replaced by a spare body, after which replacement the apparatus may be switched back to auto-drive and the normal functioning renewed.

In a preferred embodiment of the apparatus the air and grease conduits and also the injector lamp electric conductors are all provided by one multi-purpose hose, of the type described in my co-pending application No. 733,819, now Patent No. 2,521,177.

*First modified construction*

It will be obvious that the constructional features of the invention as described above may be modified. For example, in a first modified construction each individual injector, instead of being fitted with a single lamp 25 which remains illuminated in case of a fault on either stroke and which requires the said tell-tale lamps 117 and 118 to distinguish whether the fault is on a charge or discharge stroke, may be fitted with two lamps which may be differently coloured. Thus, for example, a fault on a discharge stroke may bring about the lighting of a green lamp and a fault on a charge stroke may bring about the lighting of a red lamp.

Such a modification is shown in Figures 10 to 14. In this construction, each injector is similar in construction to the injectors shown in Figure 1 and each, therefore, briefly, comprises an air-operated piston 6A fitted with a return spring 7A, and a plunger 3A slidable in a pump body 2A and controlling the opening and closing of a grease inlet port 4A.

The injector also comprises a pendulous switch lever 34A which is suspended from a screw 35A and the lower end 36A of which is bent inwards and engages in a slot in the injector piston 6A. The lever also has two lateral switch-operating arms 38A and 39A.

This construction, however, comprises two injector lamps 170 and 171, Figure 10, referred to hereinafter respectively as the "charge" and "discharge" lamps, which are normally extinguished, each being arranged behind a window of the type shown at 33, Figures 2, 4 and 8, which windows in this case are preferably differently coloured. Thus, the charge lamp 170 may be arranged behind a red window and the discharge lamp 171 behind a green window.

When the injector piston 6A moves on its charge stroke, i. e., to the left, the arm 38A is adapted to engage with the flexible switch blade 172 of the switch 172, 173 and thus force the contact on the blade 172 into engagement with the contact on the other flexible switch blade 173 thus closing the switch. When the injector piston 6A moves on its discharge stroke, i. e., to the right, the arm 39A is adapted to engage with the flexible switch blade 174 of the switch 174 and 175 and thus force the contact on the blade 174 into engagement with the contact on the flexible switch blade 175.

The charge lamp 170 is mounted between terminal brackets 176 and 177 and the discharge lamp 171 is mounted between terminal brackets 178 and 179. The charge lamp is in the charge test circuit which includes the terminal bracket 177, a lead 180, blade 173, blade 172, lead 181 and terminal bracket 176. When the injector piston 6A completes a charge stroke the switch 172—173 is closed and the charge lamp 170 is short-circuited.

The discharge lamp 171 is in the discharge test circuit which includes the terminal bracket 179, a lead 182, blade 175, blade 174, lead 183, and terminal bracket 178. When the injector piston 6A completes a discharge stroke the switch 174—175 is closed and the discharge lamp 171 is short-circuited.

Referring to Figures 11 to 13, as in the case of the apparatus described with reference to Figures 1 to 9, it is preferred to use a voltage of 50 volts and hence the apparatus includes a transformer 101A.

There are four primary circuits, viz., the transformer primary, the horn circuit, the control motor circuit and the main lubricant pump motor circuit, all as in the above described construction.

The secondary circuits are as follows: two test circuits, referred to hereinafter as the "discharge test circuit" and the "charge test circuit" respectively; two detector circuits, hereinafter referred to as the "discharge detector circuit" and the "charge detector circuit" respectively; and the "discharge circuit" and "charge circuit."

The discharge detector 115A comprises a solenoid 185 which actuates three electrically separate single pole switches 186, 187 and 188 which are mechanically bridged together. These switches are referred to hereinafter respectively as the "retainer switch," the "horn switch" and the "interrupter switch." Similarly, the charge detector 115A' comprises a solenoid 189 which actuates three electrically separate single pole switches 190, 191 and 192 which are mechanically bridged together. These switches are referred to hereinafter respectively as the "retainer switch," the "horn switch" and the "interrupter switch."

The arrangement of both detectors is such that when its solenoid is not energised the retainer and horn switches are open and the interrupter switch is closed, but when the solenoid is energised the retainer and horn switches are closed but the interrupter switch is opened.

The discharge test circuit runs from the positive side of the secondary winding 112A of the transformer 101A through the variable resistance 114A and the barretter 113A to the junction M, which is connected to the discharge lamp terminal 179 on the first injector. The discharge lamps 171 of all the injectors are connected in series to the final lamp terminal 178, which is connected to the junction point N, which in turn is connected through the charge interrupter switch 192 to the discharge test quick make, discharge test quick break, frequency quick make and quick break switches 158A, 151A, 141A and 142A, Figure 12, on the controller and back to the negative side of the transformer secondary via the two points X, X.

The charge test circuit also runs from the positive side of the transformer secondary winding 112A through the said variable resistance 114A and barretter 113A to the charge lamp terminal 177 on the first injector. The charge lamps 170 of all the injectors to the final lamp terminal 176 are connected to the junction P, which in turn is connected through the discharge interrupter switch 188 to the charge test and frequency switches 157A, 152A, 141A and 142A on the controller and back to the negative side of the transformer secondary via the conductor 355 and the points X, X.

The discharge detector circuit follows the discharge test circuit, running from the positive side of the transformer secondary winding 112A, through the variable resistance 114A and the barretter 113A to the junction point M, where it separates from the discharge test circuit and passes first through a re-set button switch 159A to the discharge detector solenoid 185, and then it rejoins the discharge test circuit at the second junction point N, after which it follows the discharge test circuit through the charge interrupter switch 192 and the discharge test frequency switches 158A, 151A, 141A and 142A and back to the negative side of the transformer secondary 112A via the two points X, X.

The charge detector circuit follows the discharge detector circuit, but after passing the reset switch 159A it runs through the charge detector solenoid 189 to the junction P, through the discharge interrupter switch 188 and the charge and frequency switches 157A, 152A, 141A and 142A and back to the negative side of the transformer secondary 112A via the two points X, X.

It will thus be seen that the discharge detector solenoid 185 is shunted from the junction M to the junction N in parallel with the discharge injector lamps 171 and the charge detector solenoid 189 is shunted from the junction M to the junction P in parallel with the charge injector lamps 170.

The discharge circuit is the same as in the construction described with reference to Figures 6 to 9, i .e., from the positive side of the transformer secondary 112A through the discharge switches 138A and 140A to the main air valve solenoid 77A and through the frequency switches 141A and 142A back to transformer secondary via the points X, X.

The charge circuit is also the same as in the construction described with reference to Figures 6 to 9, i. e., from the positive side of the transformer secondary 112A through the charge switches 149A and 150A to the solenoid 116A of the grease pump motor starter 74A, through the frequency switches 141A and 142A back to the negative side of the transformer secondary via the two points X, X.

In this construction there is no separate injector lamp circuit nor is there a horn relay circuit and the tell-tale lamps are omitted.

The operation is similar to that of the construction described above with reference to Figures 1 to 9, viz:

The apparatus having been started up as previously described, at 0 seconds the discharge circuit is closed and all the injector plungers 3A, Figure 10, carry out their discharge strokes as previously described.

At 22½ seconds the discharge test circuit is closed. If, by this time, all the injector plungers 3A have completed their strokes all the blades 174 of the injector discharge switches 174—175 will be deflected and the discharge lamps 171 short-circuited, and a green light will not appear. There will be no potential difference across the discharge detector solenoid 185, which will thus remain de-energised, the horn switch 187 will not close and the horn will not sound.

If, however, one plunger 3A has failed to complete its stroke, the blade 174 of the discharge switch associated with that plunger will not be deflected, the discharge lamp 171 will not be short-circuited, and the green light associated with that plunger will appear. A potential difference, as previously explained, will be set up across the discharge detector solenoid 185 which will accordingly be energised. The three switches 186, 187 and 188 associated therewith will be operated, the horn switch 187 closing the horn circuit and causing the horn to sound, the retainer switch 186 closing and thus short-circuiting the discharge test and frequency switches 158A, 151A, 141a and 142a, and the interrupter switch 188 opening and thus breaking the charge test circuit for a reason which will be explained hereinafter.

At 30 seconds both the discharge and discharge test circuits are opened by the controller, but if the discharge test detector solenoid 185 has been energised as described above, it remains energised even after the opening of the discharge test switches 158A and 151A because the retainer switch 186 provides an alternative circuit back to the transformer secondary, and consequently, the horn continues to sound until stopped by the attendant pressing the reset button switch 159A. This de-energises the detector solenoid 185 and allows the retainer, horn and interrupter switches 186, 187 and 188 all to return to their original positions.

At 30 seconds, also, the charge circuit is closed and all the injector plungers 3A make their charge strokes as previously described.

At 52½ seconds, i. e., 22½ seconds later, the charge test circuit is closed and the charge test is performed in similar fashion to the discharge test as previously described.

Assuming that the discharge test immediately preceding this charge test disclosed a failure on the discharge stroke and that, consequently, the discharge detector solenoid 185 was and still is energised and the horn sounding, in these circumstances there must be a potential difference between the junction M and the negative side of the transformer secondary 112A.

If the charge test does not disclose a failure all the injector switches 172, 173 will be closed and there will be no potential difference between the junction M and the junction P.

Since the junction P is normally in direct connection with the negative side of the transformer secondary 112A through the charge test and frequency switches 157A, 152A, 141A and 142A, there would normally be not potential difference between the junction M and the negative side of the transformer secondary. This would result in the discharge detector solenoid 185 being de-energised, the horn would be silenced and the warning light extinguished.

To prevent this happening the discharge interrupter switch 188 is incorporated in the charge test circuit between the junction P and the negative side of the transformer. Thus, whereas it is still possible for the injector charge switches 172, 173 to short-circuit the charge detector solenoid 189 and prevent its energisation, it is not possible to short-circuit it back to the transformer, thus short-circuiting the discharge detector solenoid as well.

For a similar reason, in order to prevent the charge detector solenoid 189 becoming de-energised by the short-circuiting of the discharge lamps 171, the charge interrupter switch 192 is incorporated in the discharge test circuit between the junction N and the negative side of the transformer.

At 60 seconds both the charge and charge test circuits are opened, thus finishing the cycle of operations. At the same time, the discharge circuit is again closed, thus re-commencing the next cycle, except as far as it is delayed by the frequency control as previously described.

*Second modified construction*

Instead of being arranged to make a contact (thereby short-circuiting the injector lamp) at the end of each stroke, each injector switch may be arranged to break a contact (thereby extinguishing the injector lamp) at the end of each stroke.

In this second modified construction which is shown in Figures 15 to 20, the injector switch, Figure 15, comprises a lever member 34B, pivotally mounted on a screw 35B. At the sides of the switch housing are a charge switch and a discharge switch, respectively having flexible blade members 196, 197 and 198, 199, the contacts on which are normally closed. The injector also includes a single injector lamp 200 which is mounted on two terminal brackets 201 and 202. The lever is provided with lateral arms 38B and 39B which are arranged to engage and deflect the blades 196 and 199 respectively when the lever is swung by the injector piston 6B to the ends of its stroke. When one of these blades is thus deflected by the arm 38B or 39B on the lever, that particular switch of which the blade forms part is opened.

In this construction, the two injector lamp switches are in series with each other and with the injector lamp 200 which together form part of a circuit including a lead 204, blades 196, 197, lead 205, terminal bracket 201, lamp 200, terminal bracket 202, lead 206, blades 198, 199 and lead 207. This circuit is incorporated in series with the charge and discharge test circuits (of which the leads 204 and 207 form a part) as will be explained hereinafter.

Referring to Figures 17 to 20, the preferred voltage is again 50 volts and in order to operate off ordinary mains a transformer 101B is incorporated.

There are four primary circuits all the same as in the previously described constructions.

The secondary circuits are as follows: discharge circuit and charge circuit as in previously described constructions; and discharge test and charge test circuits in which are incorporated their respective detector solenoids directly without shunting.

This construction does not require a barretter and variable resistance and each detector comprises two electrically separate single pole switches 208, 209 and 210, 211 mechanically bridged together and actuated respectively by solenoid coils 212 and 213. The switches 208 and 210, which are referred to hereinafter respectively as the "retainer" and the switches 209 and 211 which are referred to hereinafter respectively as the "horn switches," both close when the solenoids are energised and both function as in the construction described above with reference to Figures 11 to 14.

The discharge test circuit runs from the positive side of the secondary winding 112B of the transformer 101B to the junction P, through the discharge detector solenoid 212, the discharge test switches 151B and 158B, to the junction R, Figure 18, and through the points NN to the injector switches 199, 198, lamps 200 and injector switches 197, 196 as previously described, through the points YY to the frequency switches 141B and 142B and through the points XX to the negative side of the transformer secondary winding.

The charge test circuit runs in the same direction but from the junction P it passes through the charge detector solenoid 213 and through the charge test switches 157B, 152B and rejoins at the junction R. It should be noted that in this construction all the injector circuits, each comprising the two injector switches 196, 197 and 198, 199 and a lamp 200, are arranged in parallel.

The operation is similar to that of the construction described with reference to Figures 11 to 14.

At 0 seconds the discharge circuit is closed and all the injector plungers 3B make their discharge strokes as previously described.

At 22½ seconds the discharge test circuit is closed. If, by this time, all the injector plungers 3B have completed their strokes all the blades 199 of the injector discharge switches 198-199 will be deflected and all the circuits opened so that no current will pass, and hence none of the injector lamps will light up, the discharge detector solenoid 212 will not be energised, the horn switch 209 will not be closed and consequently the horn will not sound.

If, however, one injector plunger 3B has failed to complete its stroke, the blade 199 of the discharge switch associated with that plunger will not be deflected and the circuit will not be broken. Hence, that particular injector lamp 200 will light up, the discharge detector solenoid 212 will be energised and the two switches 208 and 209 associated therewith will be closed. The horn switch 209 closes the horn circuit and sounds the horn while the retainer switch 208 short circuits the discharge test switches 151B and 158B and the frequency switches 141B and 142B back to the negative side of the transformer secondary 112B.

The discharge tell-tale lamp 117A is incorporated in this return circuit so that it also will be illuminated.

At 30 seconds both the discharge and discharge test circuits are opened by the controller, but if the discharge detector solenoid 212 has been energised as described above, it remains energised by virtue of the closing of the retainer switch 208 even after the opening of the discharge test switches 151B and 158B. Thus the horn continues to sound and the tell-tale lamp 117A remains illuminated until stopped by the attendant pressing the re-set button switch 159B, which is arranged in a common return of the two retainer circuits.

At 30 seconds, also, the charge circuit is closed and all the injector plungers 3B make their charge strokes as previously described.

At 52½ seconds, i. e., 22½ seconds later, the charge test circuit is closed and the charge test is performed in similar fashion to the discharge test as previously described.

Let is now be assumed that the charge test has disclosed a fault. In this case one or more of the injectors will have failed to complete their charge strokes. The corresponding injector charge switch will have been left closed and when the charge test is applied, current will have flowed through the charge detector energising it and closing the horn and retainer switches.

Assuming again the following discharge test discloses everything in order, i. e., all the injector switches are opened so that no current flows through the discharge detector, this does not result in short circuiting and de-energising the charge detector. Hence in this case the interrupter switches are not necessary.

At 60 seconds, both the charge and charge test circuits are opened, thus finishing the cycle of operations. At the same time, the discharge circuit is again closed, thus re-commencing the next cycle, except as far as it is delayed by the frequency control as previously described.

*Third modified construction*

The modified constructions briefly referred to above may be combined, so that the broken contact method of switching is used with the two coloured lamps at each injector.

Thus, referring to Figure 21, the injector switch comprises a lever member 34C, pivotally mounted on a screw 35C. At the sides of the housing are two switches respectively having flexible blades 215, 216, and 217, 218 the contacts on which are normally closed, and conveniently placed adjacent to them are two injector lamps 219 and 220 respectively mounted on terminal brackets 221, 222 and 223, 224.

The lever 34C is formed with lateral arms 38C and 39C arranged to engage and deflect the blades 215 and 218 respectively when the lever is swung by the injector piston 6C to the ends of its charge and discharge strokes. When either of these blade members is thus deflected the particular switch of which it forms part is opened.

The injector lamps 219 and 220, which are hereinafter referred to as the "charge" and "discharge" lamps respectively, are arranged behind differently coloured windows, e. g., red and green as described above with reference to Figure 10.

The charge switch 215, 216 and the charge lamp 219 are in a circuit which includes a lead 228, blades 215, 216, a lead 229, terminal bracket 221, lamp 219, terminal bracket 222 and a lead 230, in series with the charge test circuit, of which the leads 228 and 230 form part. The discharge switch 217, 218 and the discharge lamp 220 are in a circuit which includes a lead 231, blades 218, 217, lead 232, terminal bracket 223, lamp 220, terminal bracket 224, lead 233 and lead 230 in series with the discharge test circuit of which the leads 231 and 230 form a part.

Referring to Figures 22 to 25, the preferred voltage is again 50 volts and hence in order to operate off ordinary mains the apparatus includes a transformer 101C.

There are four primary circuits as in the constructions described above.

The secondary circuits include discharge and charge circuits as in the previously described constructions and charge and discharge test circuits which, as in the construction described above with reference to Figures 17–20, include their respective detector solenoids 234 and 235.

This construction does not require a barretter or variable resistance and the discharge and charge detectors respectively comprise two electrically separate single pole switches 236, 237 and 239, 240 which are mechanically bridged together and are actuated by their respective solenoid coils 234 and 235. The detector switches 236 and 239 are referred to hereinafter as the "retainer" switches, and the switches 237 and 240, are referred to hereinafter as the "horn" switches respectively. The two switches 236 and 237 associated with the solenoid 234 and the two switches 239 and 240 associated with the solenoid 235 both close when their solenoid is energised and both function as in the construction described above with reference to Figures 17 to 20.

The discharge test circuit runs from the positive side of the secondary winding 112C of the transformer 101C to the junction S and to the injector discharge switch and lamp circuit 230, 233, 224, 220, 223, 232, 217, 218 and 231, through the discharge detector solenoid 234 to the discharge test switches 158C and 151C to the junction point T, to the frequency switches 141C and 142C and via the points X, X to the negative side of the transformer secondary winding 112C.

The charge test circuit runs similarly, but from the terminal bracket 222 it passes through the injector charge switch and lamp circuit 219, 221, 229, 216, 215 and 228 through the charge detector solenoid 235 and the charge test switches 157C and 152C to the junction point V, to the frequency switches 141C and 142C and back to the negative side of the transformer secondary. It should be noted that in this construction all the injector circuits (two per injector) each comprising a switch and a lamp are placed in parallel.

The operation of the apparatus is similar to that of the construction described above with reference to Figures 17 to 20.

At 0 seconds the discharge circuit is closed and all the injector plungers 3C carry out their discharge strokes as previously described.

At 22½ seconds the discharge test circuit is closed. If, by this time, all the injector plungers 3C have completed their strokes all the blades 218 of the injector discharge switches 217, 218, will be deflected and all the switches opened, so that no current will pass, the discharge lamp 220 will not be illuminated and a green light will not appear. The discharge detector solenoid 234 will not be energised, the horn switch 237 will not be closed and, consequently, the horn will not sound.

If, however, one injector plunger 3C has failed to complete its stroke, the blade 218 of the discharge switch associated with that plunger will not be deflected and the circuit will not be broken and hence the lamp 220 associated with that plunger will be illuminated and a green light will appear, the discharge detector solenoid 234 will be energised, the two switches associated therewith will be closed, the horn switch 237 closing the horn circuit and sounding the horn, the retainer switch 236 short-circuiting the discharge test switches 151C and 158C and frequency switches 141C and 142C back to the negative side of the transformer secondary 112C.

At 30 seconds both the discharge and discharge test circuits are opened by the controller, but if the discharge detector solenoid 234 has been energised as described above, it remains energised by virtue of the closing of the retainer switch 236 even after the opening of the discharge test switches 151C and 158C. Thus, the horn continues to sound and the injector discharge lamp 227 remains illuminated until stopped by the attendant pressing the re-set button switch 159C, which is arranged in a common return of the two retainer circuits.

At 30 seconds, also, the charge circuit is closed and all the injector plungers 3C carry out their charge strokes as previously described.

At 52½ seconds, i. e., 22½ seconds later, the charge test circuit is closed and the charge test is performed in similar fashion to the discharge test as previously described.

For the same reason as that given in the description of the apparatus shown in Figures 15 to 20, viz., that no short-circuit can occur and the detector solenoid 235 thus cannot be de-energised, this modification does not include interrupter switches.

At 60 seconds, both the charge and charge test circuits are opened, thus finishing the cycle of operations. At the same time the discharge circuit is again closed, thus re-commencing the next cycle, except as far as it is delayed by the frequency control as described above.

It will be noted that, whereas all the constructions described above are based on the common principle that when a fault is detected it is indicated by the sounding of an alarm and the illumination of a lamp, there is a difference between the functioning of the first construction described with reference to Figures 1 to 9 and the remaining three modified constructions described in reference to Figures 10 to 14, 15 to 20 and 21 to 25. Thus, in the first construction the injector lamps are normally alight and are only extinguished if and when the apparatus is functioning correctly, thus giving an intermittent or "winking" effect, but in the other three constructions the injector lamps are normally extinguished if the discharge and charge strokes are correctly performed and are only illuminated if and when the apparatus fails to function correctly so that there is no "winking" effect.

In certain circumstances, the winking effect may be undesirable and if so it can be avoided by a modification to the injector lamp circuit but this involves the introduction of additional switches.

Such a modification of the first construction is shown in Figures 26 to 28.

Whereas in the first construction, see Figure 6, the injector circuit ran from the positive side of the transformer secondary 112 through the variable resistance 114 and barretter 113 to the injector lamps and directly back to the negative side of the transformer secondary, in the modified construction the direct return is deleted and the circuit runs via the two points W, W, Figures 26 and 27, to an additional pair of switches 400 and 401 associated with the charge test quick make and break cams 153 and 146 respectively and functioning simultaneously with the original charge test quick make and quick break switches 157 and 152 and to the frequency switches and back to the negative side of the transformer via the points X, X.

The circuit also passes in parallel with the said additional switches 400 and 401 through a second similar pair of additional switches 403 and 404 which function simultaneously with the original discharge quick make and quick break test switches 158 and 151.

By this means the injector lamp circuit is only closed during the time during which the discharge and charge tests are being made, and the lamps will accordingly not light up while the injector pistons and plungers are making their discharge and charge strokes but only if and when a fault is disclosed during a discharge or charge test.

Similarly, it will be appreciated that by similar modification to the circuits it is possible, in the other constructions wherein the injector lamps are normally extinguished at the ends of correctly performed charge and discharge strokes, and only light up in the event of a fault, to arrange for the lamps to be normally illuminated and only extinguished when the pistons and plungers correctly perform their complete strokes.

*Minor modifications*

The discharge valve of the injector may be held on its seat during the charging operation by electro-magnetic means instead of by grease pressure as described above with reference to Figure 1.

Such a construction is shown in Figure 10 in which the discharge valve 12A is shown fitted in a piston part 13A which, however, merely serves as a guide and is formed with longitudinal grooves 241 to ensure the passage of grease from one side to the other of the piston part. The cylinder 14A in which the piston part is housed is threaded at 242 and into it is screwed an iron casing 243 containing a solenoid coil 244. The solenoid is fitted with an armature comprising a plunger type core 245 and a flange head 246. The lower end of the core passes through a seal 247 and is arranged to engage the discharge valve piston part 13A. The armature 245, 246 may be normally held in its upper position by a spring 248, although this is not essential, the upward movement of the armature being limited by the non-magnetic cover 249 of the casing 243.

The arrangement is such that when the solenoid 244 is energised the armature 245, 246 is pulled downwards and holds the discharge valve 12A on its seat, and when the solenoid is de-energised the valve is free to lift.

The solenoid coil 244 is incorporated in the charge circuit so that when the circuit is closed the discharge valve 12A is held on its seat during the charging operation as in the case of the construction shown in Figure 1.

The injector piston spring, under the influence of which the piston and plunger are moved on their mutual return or charge stroke up to the point where the inlet port of the pump is open but the injector switch has not functioned, may be omitted and the piston and plunger may be returned by grease pressure only, the latter being supplied through an inlet valve and not through a port in the pump wall uncovered by the plunger towards the end of its stroke.

Thus, referring to Figure 16, the discharge valve 12B, its piston part 13B, its housing 14B, the plug type cover and its spring 15B are all exactly the same as in the construction shown in Figure 1.

The inlet valve body 250 carries a flexible valve 251 and is formed with longitudinal grooves 252 to permit the passage of grease. The valve is slidably mounted in a bore 254 and is urged upwards by a spring 255 and held against a seat 256 formed on the lower face of the cover plug 257. A passage 258 connects the grease supply passage 259 (which corresponds with the passage 65A in Figures 1 and 5), with the cross passages 260 in the plug 257 and thence with a longitudinal passage 261 in the plug. A continuation of the passage 258 to the left connects the grease supply with the space above the discharge valve piston 13B.

In this construction the charging of the injector plunger body 2B is performed as follows: grease under pressure from the source is admitted through the passage 259 and passes through the passage 258 to the right, as shown in Figure 16, past the inlet valve 251 and thence via a passage 262 to the pump chamber 263 where, by virtue of its pressure, it forces the injector plunger 3B, see Figure 15, and its actuating piston 6B backwards to the end of their mutual stroke thereby recharging the pump. During this operation, grease also passes through the passage 258 to the left and exerting its pressure on the upperside of the discharge valve piston 13B holds the discharge valve 12B on its seat so that no unmetered grease can escape to the place of use, as described in connection with the main construction.

It will be understood, of course, that the electro-magnetic means of holding the discharge valve 13B down on its seat as described above with reference to Figure 10 might alternatively be applied in this modified construction.

In a modification of the switch arrangement shown in Figure 1, the switch comprises a flat contact member which is slidably guided for movement in the injector switch housing parallel to the movement of the injector piston 6 and plunger 3.

The contact member is provided with an arm which projects downwards through a hole in the bottom of the housing and engages in a slot cut in the skirt of the injector piston so that the contact member will be reciprocated to and fro by the reciprocating motion of the injector piston and plunger. The width of the said slot in the piston skirt is greater than the width of the contact arm so that a certain amount of lost motion is allowed between the arm and the injector piston. Thus, the contact member is only moved at each end of the piston stroke while at other times it is held in a neutral or mid-position by springs acting on the opposite ends of the member.

The said injector lamp or lamps is or are arranged in front of the injector switch and behind the said glass panel. The arrangement of the sliding contact member and the contacts with which it co-operates is such that when the member is moved by the injector piston to either end of its travel it makes contact and short-circuits the lamp terminals, so that, as explained hereinbefore, current passing through the circuit does not pass through the lamp and the latter is not illuminated.

This type of switch is more particularly applicable to the constructions described with reference to Figures 1–9 and 10–14.

Instead of the air compressor and grease pump being driven by their own separate electric motor as in the constructions described above they may be driven by other means, for example, a steam or internal combustion engine or from line shafting. In this case, the charge test circuit instead of starting and stopping an electric motor as previously described may be adapted to open and close a suitable regulating valve, or clutch, or to strike a belt on and off fast and loose pulleys.

Again, the supply of air and grease might be taken from extraneous independent sources, in which case the discharge circuit would merely open and close an air control valve as previously described and the charge circuit would merely open and close a grease control valve as previously described.

Further, the pressure-fluid for supplying the energy to operate the injector pistons and plungers may be other than compressed air, for example, water or oil, derived either from an included or an extraneous source.

The control of the electric signals and impulses by the injector pistons may be effected by means other than the mechanical movement of electric contact members as used in the various constructions described above, for example:

(a) By the use of mercury tubes or the more normal exposed metal or carbon contacts, or (b) By the movement of a portion or the whole of a magnetic system in relation to the coil which excites it, e. g., a solenoid may be moved relatively to a plunger or the armature of a horse-shoe magnet.

(c) By the relative movement of two electromagnetic coils, whether they are provided with iron circuits or not, in such a manner that the mutual induction between them is varied.

(d) By the movement relative to one another of the component parts of an electro-static condenser.

(e) By the variation of the pressure applied to a piezo-electric crystal held in between two or more electrodes.

(f) By the variation of the pressure applied to a carbon pile or similar pressure sensitive resistance elements.

While the invention has been more particularly described with reference to lubricant distribution systems making use of piston or plunger type injectors it is not limited thereto. Injectors of any other suitable type may be used such as, for example, those making use of flexible diaphragms or of deformable chambers or other elements which are adapted to be deformed mechanically for the purpose of varying their volume.

The injector disclosed herein is claimed in my divisional application Serial No. 367,633, filed July 13, 1953, for Liquid or Lubricant Injector.

I claim:

1. A lubricating system comprising a plurality of lubricant injectors wherein a charge of lubricant is introduced to charge said injectors and subsequently discharged under pressure, fault-detecting means for detecting failure of the injectors to discharge a predetermined charge of lubricant or to receive a predetermined charge including means to indicate at which injector or injectors failure has occurred, means to control the sequence of operation of said injectors and fault-detecting means including means to continue operation of the system irrespective of the failure of one or more injectors to function, and means in said fault-detecting means for indicating that a failure has occurred somewhere in the system during the continued operation of the system.

2. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means to indicate when a failure occurs anywhere in the system and means to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

3. A lubricating system as defined in claim 2, wherein the control means is adjustable to vary the duration of each cycle of operation of the system and the frequency of said cycles.

4. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge, said fault-detecting means including means to indicate when a failure occurs anywhere in the system, means to indicate at which injector or injectors failure has occurred, and means for indicating whether failure has occurred during charging or discharging of an injector or injectors, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

5. A lubricating system as defined in claim 4, wherein the fault-detecting means to indicate at which injector or injectors failure has occurred includes the means to indicate whether failure has occurred during charging or discharging of an injector, and wherein the means in said fault-detecting means for indicating when failure in the system occurs includes means to cause the same to function on failure during either charging or discharging of the injectors.

6. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means to indicate when a failure occurs anywhere in the system and means to indicate at which injector or injectors failure has occurred, means to control the sequence of operation of said injectors and fault-detecting means including means to render inoperative said fault-detecting means to indicate at which injector or injectors failure has occurred and means to continue operation of the system irrespective of the failure of one or more injectors to function, and means to render the fault-detecting means for indicating that a failure has occurred in the system continuously operative during the continued operation of the system.

7. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means to indicate when a failure occurs anywhere in the system and whether on the discharge or charge stroke of an injector or injectors and means to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

8. A lubricating system comprising a plurality of lubricant injectors wherein a charge of lubricant is introduced to charge said injectors and dicsharged under pressure, fault-detecting means for detecting failure of the injectors to discharge a predetermined charge of lubricant or to receive a predetermined charge including audible signal means to indicate when a failure occurs anywhere in the system and means including a light to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

9. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means, including an audible signal producing device and a pair of lights, to indicate when a failure occurs anywhere in the system and means including a light to indicate at which injector or injectors failure has occurred, one of said pair of lights indicating that failure has occurred during discharge of an injector or injectors and the other indicating that failure has occurred during charging of an injector or injectors, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

10. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means to indicate when a failure occurs anywhere in the system and means including a light at each injector to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system, said fault-detecting means and said control means including means to energize said lights during discharging or charging of said injectors and to deenergize the light for each injector as it completes a charge or discharge stroke.

11. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means to indicate when a failure occurs anywhere in the system and means including a normally nonilluminated light for each injector to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system, said fault-detecting means and said control means including means to energize and illuminate said lights only when the injectors fail to complete a charge or discharge stroke within a predetermined time.

12. A lubricating system comprising a plurality of lubricant injectors wherein a charge of lubricant is introduced to charge said injectors and discharged under pressure, fault-detecting means for detecting failure of the injectors to discharge a predetermined charge of lubricant or to receive a predetermined charge including means, including an audible signal producing device, to indicate when a failure occurs anywhere in the system and means including a pair of lights for each injector to indicate at which injector or injectors failure has occurred, one of said pair of lights indicating failure on a discharge stroke and the other indicating failure on a charge stroke, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system.

13. A lubricating system comprising a plurality of lubricant injectors wherein lubricant is introduced for charging said injectors and discharged under pressure, fault-detecting means for detecting failure of the injectors to discharge a predetermined charge of lubricant or to receive a predetermined charge including means to indicate when a failure occurs in the system and means to indicate at which injector or injectors failure has occurred, means to control the sequence of operation of said injectors and fault-detecting means including means to continue operation of the system irrespective of the failure of one or more injectors to function, and means to render the fault-detecting means for indicating that a failure has occurred in the system continuously operative during the continued operation of the system, and manually controlled means to discontinue operation of said last mentioned indicating means irrespective of whether or not operation of the control means has been discontinued.

14. A lubricating system comprising a plurality of lubricant injectors wherein lubricant may be introduced for charging said injectors and discharged under pressure, fault-detecting means for detecting failure of the injectors to discharge a predetermined charge of lubricant or to receive a predetermined charge including means to indicate when a failure occurs anywhere in the system and means to indicate at which injector or injectors failure has occurred, means to control the sequence of operation of said injectors and fault-detecting means including means to continue operation of the system irrespective of the failure of one or more injectors to function, means to render the fault-detecting means for indicating that a failure has occurred in the system continuously operative during the continued operation of the system, and means to condition said control means for operation manually to facilitate testing of said system for the purpose of determining at which injector or injectors failure has occurred.

15. A lubricating system comprising one or more lubricant injectors wherein lubricant may be introduced for charging said injectors and subsequently discharged under pressure, electrically operated fault-detecting means including a first signal means to indicate when a failure occurs in said system, a second signal means to indicate at which injector or injectors failure has occurred, circuits to energize both of said signal means, switch means in the circuits for said second signal means operable in response to completion of discharging or charging of said injectors to prevent the giving of a signal, and control means to control operation of said system including means operable to condition said circuits for energization at predetermined intervals and for predetermined periods of time.

16. A lubricating system comprising one or more lubricant injectors wherein lubricant may be introduced for charging said injectors and subsequently discharged under pressure, electrically operated fault-detecting means including a first signal means to indicate when a failure occurs in said system, a second signal means to indicate at which injector or injectors failure has occurred, circuits to energize both of said signal means, switch means in the circuits for said second signal means operable in response to completion of discharging or charging of said injectors to prevent the giving of a signal, control means to control operation of said system including means operable to condition said circuits for energization at predetermined intervals and for predetermined periods of time, and a holding circuit energized from said first mentioned circuits to operate said first signal means for indicating when a failure occurs in the system continuously once said signal means have been rendered operative.

17. A lubricating system comprising one or more lubricant injectors wherein a charge of lubricant is introduced for charging said injectors and subsequently discharged under pressure, control means to control the sequence and duration of operation of said injectors, electrically operated fault-detecting means including a first signal means to indicate that a failure has occurred somewhere in the system, a second signal means to indicate the injector or injectors at which failure has occurred, circuits to energize said signal means, switch means in said circuits operated by said injectors upon completion of discharging or charging of the injectors to prevent the giving of a signal in the event all of said switch means have operated, and other switch means in said circuits operated by said control means at predetermined intervals to condition said circuits for operating said signal means should any of the switch means operated by said injectors not have been operated within a predetermined interval during the discharge or charge stage in the cycle of operation of said system.

18. A lubricating system comprising one or more lubricant injectors wherein a charge of lubricant is introduced to charge said injectors and subsequently discharged under pressure, control means to control the sequence and duration of operation of said injectors, electrically operated fault-detecting means including a first signal means to indicate that a failure has occurred somewhere in the system, a second signal means to indicate the injector or injectors at which failure has occurred, circuits to energize said signal means, switch means in said circuits operated by said injectors upon completion of discharging or charging of the injectors to cause said signal means to be short-circuited in the event all of said switch means have operated, other switch means in said circuits operated by said control means at predetermined intervals to condition said circuits for operating said signal means for a predetermined interval should any of the switch means operated by said injectors not have been operated within a predetermined interval during the discharge or charge stage in a cycle of operation of said system, a holding circuit for maintaining said first signal means operative after the predetermined interval during which the control operated switches are conditioned by said control means, and manually operable switch means to render said holding circuit inoperative at will.

19. A lubricating system comprising one or more lubricant injectors wherein a charge of lubricant is introduced to charge said injectors and subsequently discharged under pressure, control means to control the sequence and duration of operation of said injectors, electrically operated fault-detecting means including a first signal means to indicate that a failure has occurred somewhere in the system, a second signal means to indicate the injector or injectors at which failure has occurred, circuits to energize said signal means, switch means in said circuits operated by said injectors upon completion of discharging or charging of the injectors to cause said signal means to be short-circuited in the event all of said switch means have operated, and other switch means in said circuits operated by said control means at predetermined intervals to condition said circuits for operating said signal means should any of the switch means operated by said injectors not have been operated within a predetermined interval during the discharge or charge stage in the cycle of operation of said system, said signal means including means to indicate whether failure of an injector to function has occurred during discharging or charging of the injectors.

20. A lubricating system comprising one or more injectors wherein a charge of lubricant is introduced to charge said injectors and subsequently discharged under pressure, electrically operated control means including means to control the duration of each cycle of operation of said injectors and means to control the frequency of operation of said injectors, electrically operated fault-detecting means including a first signal means to indicate that a failure has occurred somewhere in the system and a second signal means to indicate the injector or injectors at which a failure to operate has occurred, circuits to energize said signal means, switch means in said circuits operated by said injector upon completion of discharging or charging of the injectors to cause said signal means to be short-circuited in the event all of said switch means have operated, other switch means in said circuits operated by said control means at predetermined intervals to condition said circuits for operating said signal means for a predetermined period of time should any of the switch means operated by said injectors not have been operated within a predetermined interval during the discharge or charge stage in the cycle of operation of said system, means for manually operating said duration control means, and means to render inoperative said frequency control means when said duration control means is manually operated.

21. A lubricating system comprising one or more injectors wherein a charge of lubricant is introduced to charge said injectors and subsequently discharged under pressure, electrically operated control means including means to control the duration of each cycle of operation of said injectors and means to control the frequency of operation of said injectors, electrically operated fault-detecting means including a first signal means to indicate that a failure has occurred somewhere in the system and a second signal means to indicate the injector or injectors at which a failure to operate has occurred, circuits to energize said signal means, switch means in said circuits operated by said injector upon completion of discharging or charging of the injectors to cause said signal means to be short-circuited in the event all of said switch means have operated, other switch means in said circuits operated by said control means at predetermined intervals to condition said circuits for operating said signal means for a predetermined period of time should any of the switch means operated by said injectors not have been operated within a predetermined interval during the discharge or charge stage in the cycle of operation of said system, means for manually operating said duration control means, means to render inoperative said frequency control means when said duration control means is manually operated, and signal means to indicate when the said control means is conditioned for manual operation and said frequency control means has been rendered ineffective.

22. A lubricating system comprising one or more injectors wherein a charge of lubricant is introduced to charge said injectors and subsequently discharged under pressure, electrically operated control means including means to control the duration of each cycle of operation of said injectors and means to control the frequency of operation of said injectors, electrically operated fault-detecting means including a first signal means to indicate that a failure has occurred somewhere in the system and a second signal means to indicate the injector or injectors at which a failure to operate has occurred, circuits to energize said signal means, switch means in said circuits operated by said injector upon completion of discharging or charging of the injectors to render inoperative said signal means in the event all of said switch means have operated, other switch means in said circuits operated by said control means at predetermined intervals to condition said circuits for operating said signal means for a predetermined period of time should any of the switch means operated by said injectors not have been operated within a predetermined interval during the discharge or charge stage in the cycle of operation of said system, means for manually operating said duration control means, means to render inoperative said frequency control means when said duration control means is manually operated, and means to indicate the stage of operation of the duration control means.

23. A lubricating system comprising one or more lubricant injectors wherein lubricant may be introduced to charge said injectors and subsequently discharged under pressure, control means to control the frequency and duration of operation of said injectors, electrically operated fault-detecting means including a first signal means to indicate that a failure has occurred somewhere in the system, a second signal means individual to the injectors to indicate the injector or injectors at which a failure to operate has occurred, a circuit to energize the signal means individual to said injectors, switches in said circuit operated by said injectors upon completion of discharging or charging of the injectors to prevent the giving of a signal if all of said switches have been operated, a second circuit in parallel with said first mentioned circuit, relay switch means in the second circuit conditioned to cause a signal to be given when any of said injector switches fail to operate, and switch means operated by said control means to control the intervals at which said second circuit may be energized and the duration of energization of said second circuit.

24. A lubricating system comprising one or more lubricant injectors wherein a charge of lubricant is introduced to charge said injectors and subsequently discharged under pressure, control means to control the frequency and duration of operation of said injectors, electrically operated fault-detecting means including a first signal means to indicate that a failure has occurred somewhere in the system, a second signal means individual to the injectors to indicate the injector or injectors at which a failure to operate has occurred, a circuit to energize the signal means individual to said injectors, switches in said circuit operated by said injectors upon completion of discharging or charging of the injectors to prevent the giving of a signal if all of said switches have been operated, a detector circuit and relay switch means in parallel with said first mentioned circuit and short-circuited thereby when all of said injector switches have been operated, switch means operated by said control means to control the frequency of energization of said detector circuit, a discriminator circuit including a relay switch and said detector relay switch means, switch means operated by said control means for controlling the duration of energization of said discriminator circuit, and a circuit for said first signal means closed by said discriminator relay in the event of failure in the system.

25. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, and visual and audible fault-detecting means conditioned by said control means to operate in the predetermined interval between successive applications of fluid to the system to indicate a fault in the operation of the system.

26. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, and and fault-detecting means conditioned by said control means to operate in the predetermined interval between successive applications of fluid to the system to indicate a fault in the operation of the system, said fault-detecting means including means to indicate whether the failure in the system has occurred on the discharge or charge stroke of the injectors.

27. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, and fault-detecting means conditioned by said control means to operate in the predetermined interval between successive applications of fluid to the system to indicate a fault in the operation of the system, said fault detecting means including means individual to each injector to indicate whether failure occurred on the charge or discharge stroke thereof.

28. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, and fault-detecting means conditoned by said control means to operate in the predetermined interval between successive applications of fluid to the system to indicate a fault in the operation of the system, said fault detecting means including means individual to each injector to indicate at which injector or injectors failure has occurred which is rendered inoperative after passage of the predetermined interval elapsing between successive applications of fluid to the system discharging or recharging said injectors, and said fault-detecting means including means which continues to operate thereafter to indicate that a failure has occurred somewhere in the system.

29. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, and fault-detecting means conditioned by said control means to operate in the predetermined interval between successive applications of fluid to the system to indicate a fault in the operation of the system, said fault-detecting means including means to indicate at which injector or injectors failure occurred which is rendered inoperative after passage of the predetermined interval elasping between successive applications of fluid to the system discharging or recharging said injectors, and said fault-detecting means including means which continues to operate thereafter to indicate that a failure has occurred somewhere in the system, which means includes means to indicate whether the failure in the system occurred on the discharge or charge stroke of the injectors.

30. A lubricating system comprising one or more fluid operated injectors operable to discharge a charge of fluid, means to supply fluid under pressure to each of said injectors including pressure producing means and separate means connected to said injectors to supply fluid thereto for discharging and for recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, fault-detecting means conditioned by said control means to operate in the predetermined interval between successive applications of fluid to the system to indicate a fault in the operation of the system, said fault-detecting means including means to indicate at which injector failure has occurred, which means is rendered inoperative after passage of the predetermined interval elapsing between successive applications of fluid to the system, and said fault-detecting means including means which continues to operate thereafter to indicate that a failure has occurred somewhere in the system, and a manually controlled means for discontinuing operation of said last named indicating means.

31. A lubricating system comprising one or more fluid operated injectors operable to discharge a charge of fluid, means to supply fluid under pressure to each of said injectors including pressure producing means and separate means connected to said injectors to supply fluid thereto for discharging or recharging the same, means for directing fluid into the separate means connected to said injectors, means to control operation of said pressure producing means and directing means to cause fluid under pressure to be applied to the system for a predetermined interval sufficient to discharge said injectors and at a predetermined interval thereafter to cause fluid under pressure to be applied to the system for a predetermined interval sufficient to recharge said injectors and then to cease the application of fluid to the system for a predetermined interval, fault-detecting means conditioned by said control means to operate in the predetermined interval between successive applications of fluid to the system to indicate a fault in the operation of the system, and means to condition said control means for operation manually to facilitate testing of said system for the purpose of discovering at which injector or injectors failure has occurred and for adjusting the system.

32. A lubricating system comprising one or more fluid operated injectors operable to discharge a measured charge of lubricant, means to supply a motivating fluid under pressure to said system for discharging said injectors including pressure-accumulator means and valve means between the accumulator means and system, a source of lubricant, pressure producing means simultaneously to apply pressure to the lubricant from said source and to apply pressure to the motivating fluid in said accumulator means, means to supply lubricant under pressure from said pressure producing means to said system to recharge said injectors, means to control operation of the system in sequence to open said valve means for a predetermined interval sufficient to cause said injectors to discharge and at a predetermined interval thereafter to energize said pressure producing means for restoring the pressure in said accumulator means and to recharge said injectors, and adjustable means in said control means to vary the duration of application of both fluids to the system and the frequency of application of fluids to the system.

33. A lubricating system comprising one or more fluid operated injectors operable to discharge a measured charge of lubricant, means to supply a motivating fluid under pressure to said system for discharging said injectors including pressure-accumulator means and valve means between the accumulator means and system, a source of lubricant, pressure producing means simultaneously to apply pressure to the lubricant from said source and to apply pressure to the motivating fluid in said accumulator means, means to supply lubricant under pressure from said pressure producing means to said system to recharge said injectors, and means to control operation of the system in sequence to open said valve means for a predetermined interval sufficient to cause said injectors to discharge and at a predetermined interval thereafter to energize said pressure producing means for restoring the pressure in said accumulator means and to recharge said injectors.

34. A lubricating system as defined in claim 33, wherein separate pressure producing means is provided for applying pressure to the lubricant and the motivating fluid, and a common drive means is provided for said separate pressure producing means.

35. A lubricating system as defined in claim 33, wherein the pressure producing means and control means are electrically operated and said valve means is electromagnetically operated.

36. A lubricating system as defined in claim 33, wherein the means to supply lubricant under pressure from said pressure producing means includes a fluid pressure operated valve to vent lubricant from said system when the pressure therein exceeds a predetermined maximum during the application of lubricant to the system, and wherein a connection is provided between said valve and said means for supplying motivating fluid to the system for operating said valve to vent the means for supplying lubricant to the system when motivating fluid is being supplied to the system.

37. A lubricating system comprising one or more hydraulically operated injectors operable to discharge a measured charge of lubricant, means to supply a motivating fluid under pressure to said system for discharging said injectors including pressure accumulating means, valve means to control the flow of motivating fluid from said accumulating means to said system, pressure producing means to apply pressure to the motivating fluid in said accumulating means and for supplying lubricant under pressure to the system, means to control operation of said system including means effective in sequence to open said valve means and cause motivating fluid to be supplied to said system for discharging said injectors and to operate said pressure producing means simultaneously to restore the pressure in said accumulating means and to supply lubricant to the system for recharging said injectors, pressure-sensitive means to cause said pressure producing means to operate while motivating fluid is being supplied to said system should the pressure on the said fluid drop below a predetermined minimum, and means to bypass lubricant from said system while motivating fluid is being supplied to said system.

38. A lubricating system as defined in claim 37, wherein the means to bypass lubricant from said injectors comprises fluid pressure operated valve means operable in response to the application of motivating fluid to said system to vent the lubricant pressure produced by said pressure producing means.

39. A lubricating system comprising a plurality of fluid operated injectors operable to discharge a measured charge of lubricant, means for supplying lubricant to said injectors for recharging the same, means to relieve the pressure in said lubricant supply means including fluid pressure operated bypass valve means, a source of motivating fluid under pressure, valve means to control the application of motivating fluid to said system for discharging said injectors, control means to control operation of the valve means controlling flow of motivating fluid and the lubricant supply means, and a connection on the outlet side of said motivating fluid control valve means between the source of motivating fluid under pressure and the fluid pressure operated valve means for operating the latter to vent said lubricant supply means while motivating fluid under pressure is applied to the system for discharging said injectors.

40. A lubricating system comprising a plurality of fluid operated injectors operable to discharge a measured charge of lubricant, means for supplying lubricant to said injectors for recharging the same, means to relieve the pressure in said lubricant supply means including fluid pressure operated bypass valve means, a source of motivating fluid under pressure, valve means to control the application of motivating fluid to said system for discharging said injectors, control means to control operation of the valve means controlling flow of motivating fluid and the lubricant supply means, a connection on the outlet side of said motivating fluid control valve means between the source of motivating fluid under pressure and the fluid pressure operated valve means for operating the latter to vent said lubricant supply means while motivating fluid under pressure is applied to the system for discharging said injectors, said bypass valve means including a part exposed to the pressure in said lubricant supply when lubricant is being supplied to said injectors for urging said bypass valve means to open position, and yieldable means for urging said bypass valve means to closed position yielding when the presusre in said lubricant supply exceeds a predetermined maximum to cause lubricant to be bypassed from said lubricant supply.

CAMILLE CLARE SPRANKLING
LE CLAIR.

References Cited in the file of this patent

UNITED STATES PATENTS

| Number | Name | Date |
|---|---|---|
| 1,852,058 | Otis | Apr. 5, 1932 |
| 2,038,287 | Hawks | Apr. 21, 1936 |
| 2,122,177 | Klein | June 28, 1938 |
| 2,141,022 | Rotter | Dec. 20, 1938 |
| 2,206,335 | Rotter | July 2, 1940 |